US010080134B2

(12) United States Patent
Suzuki et al.

(10) Patent No.: US 10,080,134 B2
(45) Date of Patent: Sep. 18, 2018

(54) TERMINAL DEVICE, BASE STATION APPARATUS, COMMUNICATION METHOD, AND INTEGRATED CIRCUIT

(71) Applicant: Sharp Kabushiki Kaisha, Sakai, Osaka (JP)

(72) Inventors: Shoichi Suzuki, Osaka (JP); Tatsushi Aiba, Osaka (JP); Kimihiko Imamura, Osaka (JP); Kazuyuki Shimezawa, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/121,260

(22) PCT Filed: Jul. 1, 2016

(86) PCT No.: PCT/JP2016/069695
§ 371 (c)(1),
(2) Date: Aug. 24, 2016

(87) PCT Pub. No.: WO2017/006877
PCT Pub. Date: Jan. 12, 2017

(65) Prior Publication Data

US 2017/0171739 A1 Jun. 15, 2017

(30) Foreign Application Priority Data

Jul. 3, 2015 (JP) ................................ 2015-133996
Jul. 21, 2015 (JP) ................................ 2015-143578

(51) Int. Cl.
*H04W 8/24* (2009.01)
*H04W 16/28* (2009.01)
(Continued)

(52) U.S. Cl.
CPC ............ *H04W 8/24* (2013.01); *H04W 16/28* (2013.01); *H04W 28/04* (2013.01);
(Continued)

(58) Field of Classification Search
None
See application file for complete search history.

(56) References Cited

U.S. PATENT DOCUMENTS 8,351,347 B2 1/2013 Noh et al.
9,313,652 B2 4/2016 Abe et al.
(Continued)

FOREIGN PATENT DOCUMENTS

JP 2012-527153 A 11/2012
WO WO 2012/150668 A1 11/2012
WO WO 2014/084638 A1 6/2014

OTHER PUBLICATIONS

Lte Advanced, "3rd Generation Partnership Project; Technical Specification Group Radio Access Network; Evolved Universal Terrestrial Radio Access (E-TRA); Multiplexing and channel coding", (Release 12), 3GPP TS 36.212 V12.4.0 (Mar. 2015).
(Continued)

*Primary Examiner* — Brian Roberts
(74) *Attorney, Agent, or Firm* — Birch, Stewart, Kolasch & Birch, LLP

(57) ABSTRACT

A terminal device transmits a RI for PDSCH transmission, receives first information used for determining a first maximum value of layers, the first maximum value being assumed for determining a bit width for the RI, and receives a transport block on a PDSCH, and decodes a code block of the transport block. Here, rate matching for the code block is performed based on the first information used for determining the first maximum value of the layer.

14 Claims, 24 Drawing Sheets

TERMINAL DEVICE 1
BASE STATION APPARATUS 3
UECapabilityEnquiry S160
UECapabilityInformation S161
S162 DETERMINE CONFIGURATIONS OF CARRIER AGGREGATION, TRANSMISSION MODE, AND/OR MIMO
RRCConnectionReconfiguration S163
RRCConnectionReconfigurationComplete S164
SPECIFY BIT WIDTH FOR RI S165
RI on PUSCH and/or PUCCH S166
SPECIFY SOFT BUFFER SIZE, AND RATE-MATCHING FOR CODE BLOCK OF TRANSPORT BLOCK S167
Transport block on PDSCH S168
STORE SOFT CHANNEL BIT OF CODE BLOCK IN CASE WHERE ATTEMPT TO DECODE CODE BLOCK FAILS S169

(51) Int. Cl.
*H04W 28/04* (2009.01)
*H04W 72/06* (2009.01)
*H04W 72/04* (2009.01)
*H04W 88/02* (2009.01)
*H04W 88/08* (2009.01)

(52) U.S. Cl.
CPC ......... *H04W 72/042* (2013.01); *H04W 72/06* (2013.01); *H04W 88/02* (2013.01); *H04W 88/08* (2013.01)

(56) References Cited

U.S. PATENT DOCUMENTS

2012/0076037 A1 3/2012 Noh et al.
2013/0095816 A1* 4/2013 Gerstenberger .. H04W 72/0406 455/422.1
2014/0044061 A1 2/2014 Yue et al.
2014/0045497 A1* 2/2014 Abe ...................... H04L 1/0067 455/435.1
2014/0269627 A1* 9/2014 Gorokhov ......... H04W 72/0446 370/336

OTHER PUBLICATIONS

Lte Advanced, “3rd Generation Partnership Project; Technical Specification Group Radio Access Network; Evolved Universal Terrestrial Radio Access (E-TRA); Physical channels and modulation”, (Release 12), 3GPP TS 36.211 V12.5.0 (Mar. 2015).
Lte Advanced, “3rd Generation Partnership Project; Technical Specification Group Radio Access Network; Evolved Universal Terrestrial Radio Access (E-TRA); Physical layer procedures”, (Release 12), 3GPP TS 36.213 V12.5.0 (Mar. 2015).
Lte Advanced, “3rd Generation Partnership Project; Technical Specification Group Radio Access Network; Evolved Universal Terrestrial Radio Access (E-TRA); User Equipment (UE) radio access capabilites”, (Release 12), 3GPP TS 36.306 V12.4.0 (Mar. 2015).
Lte Advanced, “3rd Generation Partnership Project; Technical Specification Group Radio Access Network; Evolved Universal Terrestrial Radio Access (E-TRA); User Equipment (UE) radio transmission and reception”, Release 12), 3GPP TS 36.101 V12.7.0 (Mar. 2015).

* cited by examiner

TIME
RADIO FRAME
10 ms
HALF FRAME
5 ms
1 ms
SLOT
0.5 ms
Subframe#0
Subframe#1
Subframe#2
Subframe#3
Subframe#4
Subframe#5
Subframe#6
Subframe#7
Subframe#8
Subframe#9
DwPTS
GP
UpPTS
DOWNLINK-TO-UPLINK
SWITCH-POINT PERIODICITY
(downlink-to-uplink
switch-point periodicity)
5 ms
10 ms

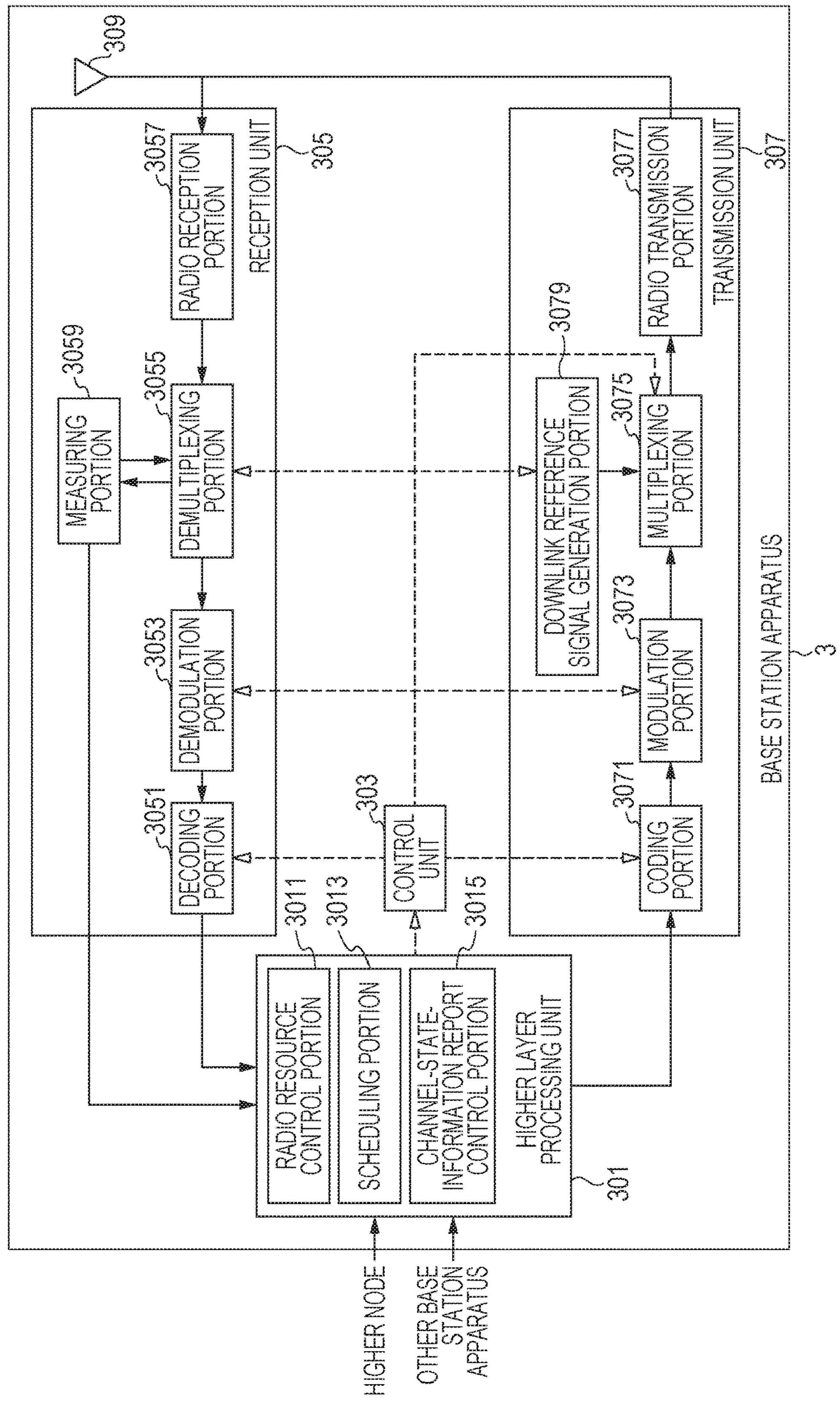
FIG. 5
309
3057
RADIO RECEPTION PORTION
RECEPTION UNIT
305
3059
MEASURING PORTION
3055
DEMULTIPLEXING PORTION
3053
DEMODULATION PORTION
3051
DECODING PORTION
303
CONTROL UNIT
3011
3013
3015
RADIO RESOURCE CONTROL PORTION
SCHEDULING PORTION
CHANNEL-STATE-INFORMATION REPORT CONTROL PORTION
HIGHER LAYER PROCESSING UNIT
301
HIGHER NODE
OTHER BASE STATION APPARATUS
3077
RADIO TRANSMISSION PORTION
TRANSMISSION UNIT
307
3079
DOWNLINK REFERENCE SIGNAL GENERATION PORTION
3075
MULTIPLEXING PORTION
3073
MODULATION PORTION
3071
CODING PORTION
BASE STATION APPARATUS
3

FIG. 8

| Transmission Mode (P800) | DCI format (P801) | Transmission scheme of PDSCH corresponding to PDCCH (the number of supported layers) (P802) |
|---|---|---|
| Mode 4 | DCI format 2 | Closed-loop spatial multiplexing (up to 4 layers) or Transmit diversity (1 layer) |
| Mode 5 | DCI format 1D | Multi-user MIMO (1 layer) |
| Mode 6 | DCI format 1B | Closed-loop spatial multiplexing (1 layer) |
| Mode 8 | DCI format 2B | Dual layer transmission (2 layers) or Single-antenna port (1 layer) |
| Mode 9 | DCI format 2C | Up to 8 layer transmission (up to 8 layers) or Single-antenna port (1 layer) |
| Mode 10 | DCI format 2D | Up to 8 layer transmission (up to 8 layers) or Single-antenna port (1 layer) |

FIG. 9

| UE Radio Access Capability parameter (P900) | UE Category (P901) | Total number of soft channel bits (P902) | Maximum number of supported layers for spatial multiplexing in DL (P903) |
|---|---|---|---|
| *ue-Category* (without suffix) | Category 1 | 250368 | 1 |
| | Category 2 | 1237248 | 2 |
| | Category 3 | 1237248 | 2 |
| | Category 4 | 1827027 | 2 |
| | Category 5 | 3667200 | 4 |
| *ue-Category-v1020* | Category 6 | 3654144 | 2 or 4 |
| | Category 7 | 3654144 | 2 or 4 |
| | Category 8 | 35982720 | 8 |
| *ue-Category-v1170* | Category 9 | 5481216 | 2 or 4 |
| | Category 10 | 5481216 | 2 or 4 |
| *ue-Category-v11a0* | Category 11 | 7308288 | 2 or 4 |
| | Category 12 | 7308288 | 2 or 4 |

FIG. 10

| UE Radio Access Capability parameter (P1000) | UE DL Category (P1001) | Total number of soft channel bits (P1002) | Maximum number of supported layers for spatial multiplexing in DL (P1003) |
|---|---|---|---|
| *ue-CategoryDL-r12* | DL Category 0 | 25344 | 1 |
| | DL Category 6 | 3654144 | 2 or 4 |
| | DL Category 7 | 3654144 | 2 or 4 |
| | DL Category 9 | 5481216 | 2 or 4 |
| | DL Category 10 | 5481216 | 2 or 4 |
| | DL Category 11 | 7308288 | 2 or 4 |
| | DL Category 12 | 7308288 | 2 or 4 |
| | DL Category 13 | 3654144 | 2 or 4 |
| | DL Category 14 | 47431680 | 8 |

FIG. 11

| Case | *ue-CategoryDL-r12* | *ue-Category-v11a0* | *ue-Category-v1170* | *ue-Category-v1020* | *ue-Category* (without suffix) |
|---|---|---|---|---|---|
| Case 1 | | | | Category 6 | Category 4 |
| Case 2 | | | | Category 7 | Category 4 |
| Case 3 | | | | Category 8 | Category 5 |
| Case 4 | | | Category 9 | Category 6 | Category 4 |
| Case 5 | | | Category 10 | Category 7 | Category 4 |
| Case 6 | | Category 11 | Category 9 | Category 6 | Category 4 |
| Case 7 | | Category 12 | Category 10 | Category 7 | Category 4 |
| Case 8 | DL Category 0 | | | | |
| Case 9 | DL Category 6 | | | Category 6 | Category 4 |
| Case 10 | DL Category 7 | | | Category 7 | Category 4 |
| Case 11 | DL Category 9 | | Category 9 | Category 6 | Category 4 |
| Case 12 | DL Category 10 | | Category 10 | Category 7 | Category 4 |
| Case 13 | DL Category 11 | Category 11 | Category 9 | Category 6 | Category 4 |
| Case 14 | DL Category 12 | Category 12 | Category 10 | Category 7 | Category 4 |
| Case 15 | DL Category 13 | | | Category 6 or 7 | Category 4 |
| Case 16 | DL Category 14 | | | Category 8 | Category 5 |

FIG. 12

| Bandwidth Class | Aggregated Transmission Bandwidth Configuration | Number of contiguous component carriers |
|---|---|---|
| A | $N_{RB,agg} \leq 100$ | 1 |
| B | $25 < N_{RB,agg} \leq 100$ | 2 |
| C | $100 < N_{RB,agg} \leq 200$ | 2 |
| D | $200 < N_{RB,agg} \leq 300$ | 3 |
| E | $300 < N_{RB,agg} \leq 400$ | 4 |
| F | $400 < N_{RB,agg} \leq 500$ | 5 |

FIG. 15

| ca-BandwidthClassDL-r10 | supportedMIMO-CapabilityDL-r10 | supportedMIMO-CapabilityDL-v10xx |
|---|---|---|
| A | 4 | {4} |
| B | 2 | {4, 2} |
| C | 2 | {4, 2} |
| D | 2 | {2, 2, 2} |

FIG. 18

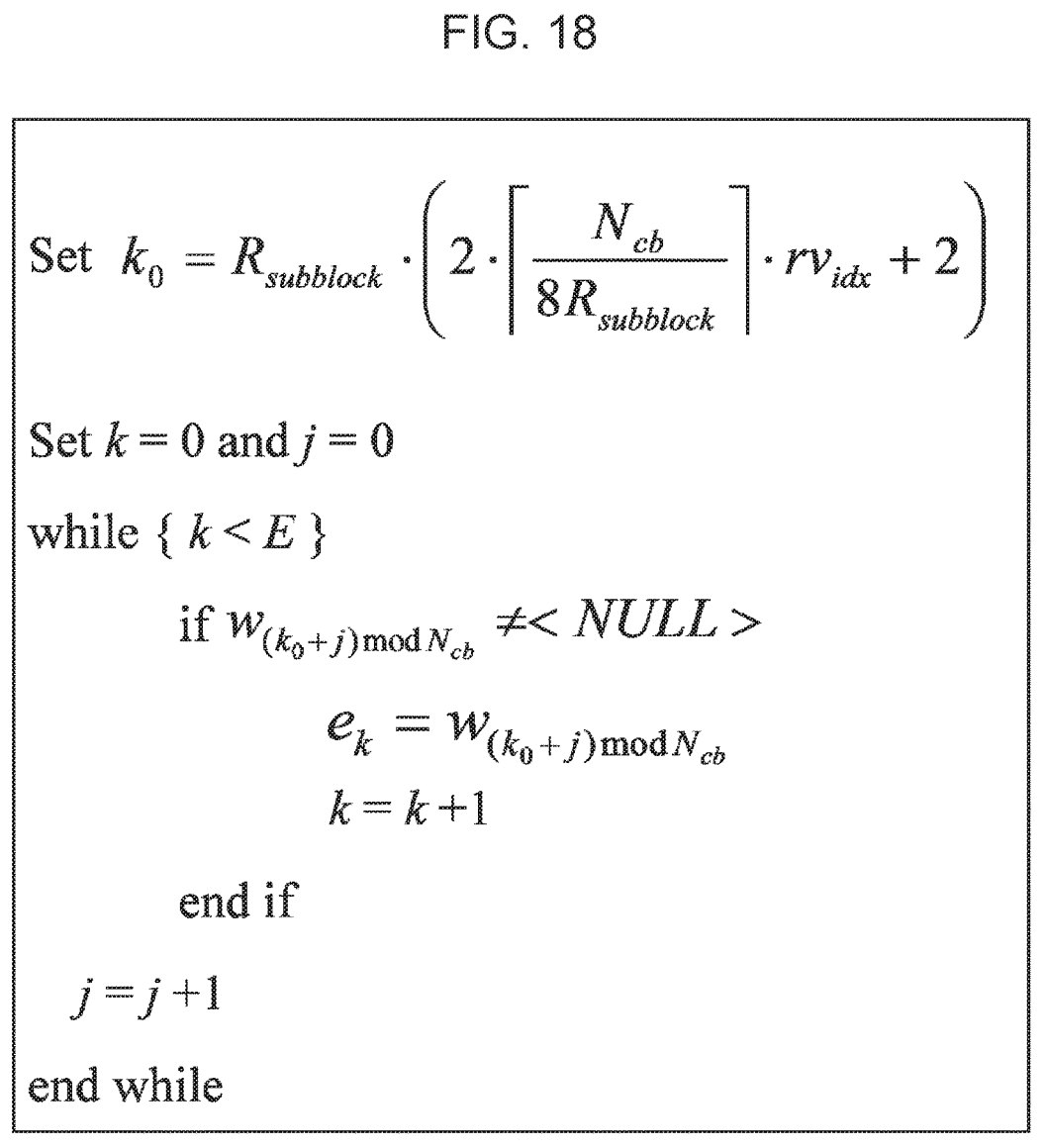

Set $k_0 = R_{subblock} \cdot \left( 2 \cdot \left\lceil \frac{N_{cb}}{8R_{subblock}} \right\rceil \cdot rv_{idx} + 2 \right)$ Set $k = 0$ and $j = 0$ while { $k < E$ } if $w_{(k_0+j) \bmod N_{cb}} \neq$ < NULL >

$e_k = w_{(k_0+j) \bmod N_{cb}}$ $k = k + 1$ end if $j = j + 1$ end while

FIG. 20

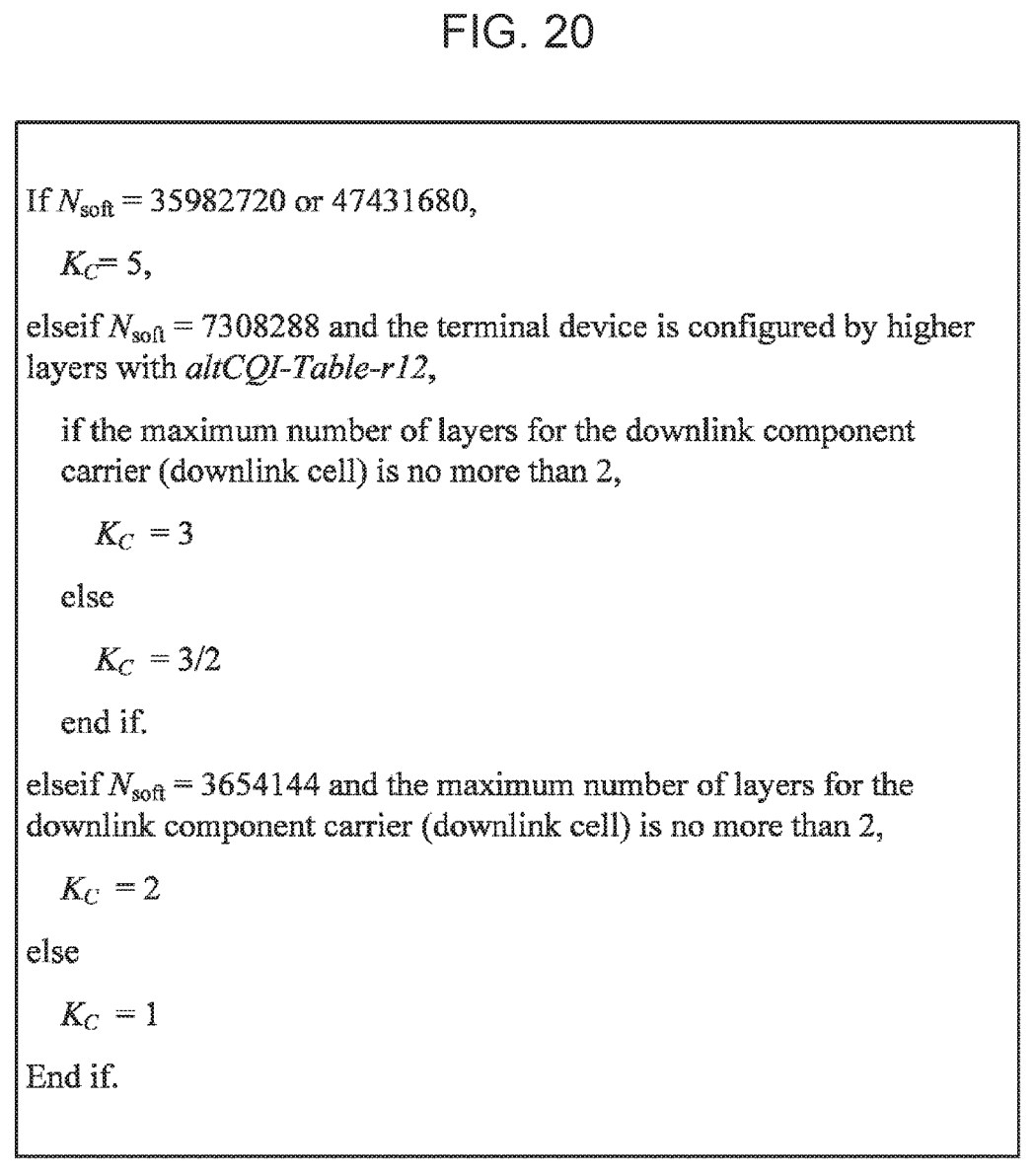

If $N_{soft}$ = 35982720 or 47431680, $K_C$ = 5, elseif $N_{soft}$ = 7308288 and the terminal device is configured by higher layers with *altCQI-Table-r12*, if the maximum number of layers for the downlink component carrier (downlink cell) is no more than 2, $K_C$ = 3 else $K_C$ = 3/2 end if.

elseif $N_{soft}$ = 3654144 and the maximum number of layers for the downlink component carrier (downlink cell) is no more than 2, $K_C$ = 2 else $K_C$ = 1

End if.

FIG. 23

| | | | | | |
|---|---|---|---|---|---|
| BandCombinationParameters-r10 (P2300) | BandParameters-r10 (P2310) | bandEUTRA-r10 | FreqBandIndicator (P2311) | | Band X |
| | | bandParametersDL-r10 | CA-MIMO-ParametersDL-r10 | ca-BandwidthClassDL-r10 (P2312) | A |
| | | | | supportedMIMO-CapabilityDL-r10 (P2313) | 4 |
| | | bandParametersUL-r10 | CA-MIMO-ParametersUL-r10 | ca-BandwidthClassUL-r10 (P2314) | A |
| | BandParameters-r10 (P2320) | bandEUTRA-r10 | FreqBandIndicator (P2321) | | Band X |
| | | bandParametersDL-r10 | CA-MIMO-ParametersDL-r10 | ca-BandwidthClassDL-r10 (P2322) | A |
| | | | | supportedMIMO-CapabilityDL-r10 (P2323) | 2 |

FIG. 24

| | | | | | |
|---|---|---|---|---|---|
| BandCombinationParameters-r10 (P2400) | BandParameters-r10 (P2310) | bandEUTRA-r10 | FreqBandIndicator (P2311) | | Band X |
| | | bandParametersDL-r10 | CA-MIMO-ParametersDL-r10 | ca-BandwidthClassDL-r10 (P2312) | A |
| | | | | supportedMIMO-CapabilityDL-r10 (P2313) | 4 |
| | | bandParametersUL-r10 | CA-MIMO-ParametersUL-r10 | ca-BandwidthClassUL-r10 (P2314) | A |
| | BandParameters-r10 (P2420) | bandEUTRA-r10 | FreqBandIndicator (P2321) | | Band X |
| | | bandParametersDL-r10 | CA-MIMO-ParametersDL-r10 | ca-BandwidthClassDL-r10 (P2322) | A |
| | | | | supportedMIMO-CapabilityDL-r10 (P2323) | 2 |
| | | bandParametersUL-r10 | CA-MIMO-ParametersUL-r10 | ca-BandwidthClassUL-r10 (P2424) | A |

TERMINAL DEVICE, BASE STATION APPARATUS, COMMUNICATION METHOD, AND INTEGRATED CIRCUIT

TECHNICAL FIELD

The present invention relates to a terminal device, a base station apparatus, a communication method, and an integrated circuit.

This application is based upon and claims the benefit of priority of the prior Japanese Patent Application No. 2015-133996, filed on Jul. 3, 2015, and the prior Japanese Patent Application No. 2015-143578, filed on Jul. 21, 2015; the entire contents of which are incorporated herein by reference.

BACKGROUND ART

A radio access scheme and a radio network of the cellular mobile communication (below referred to as "Long Term Evolution (LTE)" or "Evolved Universal Terrestrial Radio Access: EUTRA") are examined in 3rd Generation Partnership Project (3GPP). In the LTE, a base station apparatus is referred to as an evolved NodeB (eNodeB), and a terminal device is referred to as user equipment (UE). The LTE is a cellular communication system in which a plurality of areas which are respectively covered by base station apparatuses and have a cell shape are disposed. A single base station apparatus may manage a plurality of cells.

Carrier aggregation and Multiple-Input Multiple-Output (MIMO) are introduced to the LTE. In carrier aggregation, a terminal device communicates with a base station apparatus through a plurality of carriers (cells) which are integrated. In MIMO, a plurality of layers is spatially multiplexed. MIMO is introduced from LTE release 8, and carrier aggregation is introduced from LTE release 10 (NPL 2, 3, and 4).

In the LTE, even after MIMO and carrier aggregation have been introduced, functions of MIMO and carrier aggregation are continuously enhanced. A terminal device transmits capability information which indicates the technique of MIMO and carrier aggregation supported by the terminal device, to a base station apparatus (NPL 5).

CITATION LIST

Non Patent Literature

NPL 1: "3GPP TS 36.101 V12.7.0 (2015-03)", 2 Apr. 2015.

NPL 2: "3GPP TS 36.211 V12.5.0 (2015-03)", 26 Mar. 2015.

NPL 3: "3GPP TS 36.212 V12.4.0 (2015-03)", 26 Mar. 2015.

NPL 4: "3GPP TS 36.213 V12.5.0 (2015-03)", 26 Mar. 2015.

NPL 5: "3GPP TS 36.306 V12.4.0 (2015-03)", 27 Mar. 2015.

DISCLOSURE OF THE INVENTION

Problems to be Solved by the Invention

However, in a wireless system as described above, a real operation of a base station apparatus is different from an operation of the base station apparatus, which is assumed by a terminal device, and thus normal communication between the base station apparatus and the terminal device is not possible. For example, for a bit width of a rank indicator (RI) subjected to feedback to the base station apparatus by the terminal device, rate matching of a code block in a downlink transport block, storing of a soft channel bit, and the like, a real operation of the base station apparatus may be different from an operation of the base station apparatus, which is assumed by a terminal device, and/or a real operation of the terminal device may be different from an operation of the terminal device, which is assumed by the base station apparatus.

Considering the above problem, an object of the present invention is to provide a terminal device which can efficiently communicate with a base station apparatus, the base station apparatus, a communication method, and an integrated circuit.

Means for Solving the Problems (1) In order to achieve the above objects, aspects of the present invention include the following means. According to a first aspect of the present invention, there is provided a terminal device which includes a transmission unit that transmits a rank indicator (RI) for physical downlink shared channel (PDSCH) transmission, a reception unit that receives first information used for determining a first maximum value of layers, the first maximum value being assumed for determining a bit width for the RI, and that receives a transport block on a PDSCH, and a decoding portion that decodes a code block of the transport block. Rate matching for the code block is performed based on at least a soft buffer size for the code block. The soft buffer size for the code block is determined based on at least the first information which is used for determining the first maximum value of the layers.

(2) According to a second aspect of the present invention, there is provided a base station apparatus which includes a reception unit that receives a rank indicator (RI) for physical downlink shared channel (PDSCH) transmission, from a terminal device, a transmission unit that transmits first information used by the terminal device for determining a first maximum value of layers to the terminal device, the first maximum value being assumed by the terminal device in order to determine a bit width for the RI, and that transmits a transport block on a PDSCH to the terminal device, and a coding portion that codes a code block of the transport block. Rate matching for the coded code block is performed based on at least a soft buffer size for the code block. The soft buffer size for the code block is determined based on at least the first information which is used for determining the first maximum value of the layers by the terminal device.

(3) According to a third aspect of the present invention, there is provided a communication method used in a terminal device. The communication method includes transmitting a rank indicator (RI) for physical downlink shared channel (PDSCH) transmission, receiving first information used for determining a first maximum value of layers, the first maximum value being assumed for determining a bit width for the RI, and receiving a transport block on a PDSCH, and decoding a code block of the transport block. Rate matching for the code block is performed based on at least a soft buffer size for the code block. The soft buffer size for the code block is determined based on at least the first information which is used for determining the first maximum value of the layers.

(4) According to a fourth aspect of the present invention, there is provided a communication method used in a base station apparatus. The communication method includes receiving a rank indicator (RI) for physical downlink shared channel (PDSCH) transmission, from a terminal device, transmitting first information used by the terminal device for determining a first maximum value of layers to the terminal device, the first maximum value being assumed by the terminal device in order to determine a bit width for the RI, transmitting a transport block on a PDSCH to the terminal device, and coding a code block of the transport block. Rate matching for the coded code block is performed based on at least a soft buffer size for the code block. The soft buffer size for the code block is determined based on at least the first information which is used by the terminal device in order to determine the first maximum value of the layers.

(5) According to a fifth aspect of the present invention, there is provided an integrated circuit which causes a terminal device to perform a series of functions. The functions include a function of transmitting a rank indicator (RI) for physical downlink shared channel (PDSCH) transmission, a function of receiving first information used for determining a first maximum value of layers, the first maximum value being assumed for determining a bit width for the RI, a function of receiving a transport block on a PDSCH, and a function of decoding a code block of the transport block. Rate matching for the code block is performed based on at least a soft buffer size for the code block. The soft buffer size for the code block is determined based on at least the first information which is used for determining the first maximum value of the layers.

(6) According to a sixth aspect of the present invention, there is provided an integrated circuit which causes a base station apparatus to perform a series of functions. The functions include a function of receiving a rank indicator (RI) for physical downlink shared channel (PDSCH) transmission, from a terminal device, a function of transmitting first information used for determining a first maximum value of layers, the first maximum value being assumed by the terminal device in order to determine a bit width for the RI, a function of transmitting a transport block on a PDSCH to the terminal device, and a function of coding a code block of the transport block. Rate matching for the coded code block is performed based on at least a soft buffer size for the code block. The soft buffer size for the code block is determined based on at least the first information which is used by the terminal device in order to determine the first maximum value of the layers.

(7) According to a seventh aspect of the present invention, there is provided a terminal device in which a plurality of downlink component carriers which include a first downlink component carrier are configured, the plurality of downlink component carrier being in a first band in a first band combination. The terminal device includes a transmission unit that transmits a rank indicator (RI) which corresponds to physical downlink shared channel (PDSCH) transmission in the first downlink component carrier, and corresponds to the number of layers, and is determined by the terminal device, and a reception unit that receives the PDSCH. The transmission unit transmits capability information which includes first information, second information, third information, fourth information, and/or fifth information. The reception unit receives sixth information for the first downlink component carrier. The first information indicates a UE category corresponding to a first maximum value of layers supported by the terminal device in a downlink. The second information indicates a first bandwidth class which is used for the first band in the first band combination, and corresponds to the number of downlink component carriers supported by the terminal device. The third information indicates a second bandwidth class which is used for the first band in the first band combination, and corresponds to the number of downlink component carriers supported by the terminal device. The fourth information indicates a second maximum value of the layers which is supported by the terminal device in a downlink. The second maximum value is applied to all of one or the plurality of downlink component carriers which correspond to the first bandwidth class of the first band in the first band combination. The fifth information indicates a third maximum value of the layers supported by the terminal device in the downlink. The third maximum value is applied to all of one or the plurality of downlink component carriers which correspond to the second bandwidth class of the first band in the first band combination. The sixth information indicates a fourth maximum value of the layers. The fifth maximum value of the layers which is assumed for determining a bit width for the RI is determined based on whether or not the sixth information for the first downlink component carrier is configured. The determination is performed with reference to any one of the first maximum value of the layers and the fourth maximum value of the layers.

(8) According to an eighth aspect of the present invention, there is provided a base station apparatus which communicates with a terminal device in which a plurality of downlink component carriers which include a first downlink component carrier are configured, the plurality of downlink component carrier being in a first band in a first band combination. The base station apparatus includes a reception unit that receives a rank indicator (RI) which corresponds to physical downlink shared channel (PDSCH) transmission in the first downlink component carrier, and corresponds to the number of layers, and is determined by the terminal device, from the terminal device, and a transmission unit that transmits the PDSCH to the terminal device. The reception unit receives capability information which includes first information, second information, third information, fourth information, and/or fifth information. The transmission unit transmits sixth information for the first downlink component carrier. The first information indicates a UE category corresponding to a first maximum value of layers supported by the terminal device in a downlink. The second information indicates a first bandwidth class which is used for the first band in the first band combination, and corresponds to the number of downlink component carriers supported by the terminal device. The third information indicates a second bandwidth class which is used for the first band in the first band combination, and corresponds to the number of downlink component carriers supported by the terminal device. The fourth information indicates a second maximum value of the layers supported by the terminal device in the downlink. The second maximum value is applied to all of one or the plurality of downlink component carriers which correspond to the first bandwidth class of the first band in the first band combination. The fifth information indicates a third maximum value of the layers supported by the terminal device in the downlink. The third maximum value is applied to all of one or the plurality of downlink component carriers which correspond to the second bandwidth class of the first band in the first band combination. The sixth information indicates a fourth maximum value of the layers. A fifth maximum value of the layer which is assumed for determining a bit width for the RI is determined based on whether or not the sixth information for the first downlink component carrier is configured in the terminal device. The determination is performed with reference to any one of the first maximum value of the layer and the fourth maximum value of the layer.

Effects of the Invention

According to the aspects of the invention, it is possible to efficiently perform communication between a terminal device and a base station apparatus.

BRIEF DESCRIPTION OF THE DRAWINGS

FIG. 5 is a schematic block diagram illustrating a structure of a base station apparatus 3 according to the embodiment.

FIG. 8 is a diagram illustrating an example of a correspondence between a transmission mode, a DCI format, and a transmission scheme of a PDSCH in the embodiment.

FIG. 9 is a diagram illustrating an example of a UE category in the embodiment.

FIG. 10 is a diagram illustrating an example of a downlink UE category in the embodiment.

FIG. 11 is a diagram illustrating an example of a combination of categories indicated by a plurality of capability parameters in the embodiment.

FIG. 12 is a diagram illustrating an example of a bandwidth class in the embodiment.

FIG. 15 is a diagram illustrating an example of a combination of a bandwidth class and MIMO capability in the embodiment.

FIG. 18 is a diagram illustrating an example of bit selection and bit pruning in the embodiment.

FIG. 20 is a diagram illustrating an example of a configuring method of $K_c$ in the embodiment.

FIG. 23 is a diagram illustrating an example of a parameter BandCombinationParameters-r10 in the embodiment.

FIG. 24 is a diagram illustrating an example of the parameter BandCombinationParameters-r10 in the embodiment.

MODE FOR CARRYING OUT THE INVENTION

Hereinafter, an embodiment according to the present invention will be described. In the embodiment, a plurality of cells is configured in a terminal device. A technique of the terminal device performing communication through the plurality of cells is referred to as cell aggregation or carrier aggregation. The present invention may be applied to each of the plurality of cells configured for the terminal device. The present invention may be applied to some of the plurality of cells configured for the terminal device. A cell configured in the terminal device is also referred to as a serving cell. Any one of the time division duplex (TDD) scheme, and the frequency division duplex (FDD) is applied to each cell.

A plurality of configured serving cells includes one primary cell (PCell) and one or a plurality of secondary cells (SCells). The primary cell is a serving cell in which an initial connection establishment procedure is performed, a serving cell in which a connection re-establishment procedure is started, or a cell of which an instruction as a primary cell is performed in a handover procedure. The secondary cell may be configured when or after RRC connection is established.

In a downlink, a carrier corresponding to a cell is referred to as a downlink component carrier. In an uplink, a carrier corresponding to a cell is referred to as an uplink component carrier. The component carrier includes a transmission bandwidth configuration. For example, the transmission bandwidth configuration includes 1.4 MHz, 5 MHz, 10 MHz, 15 MHz, and 20 MHz.

Figure 1:
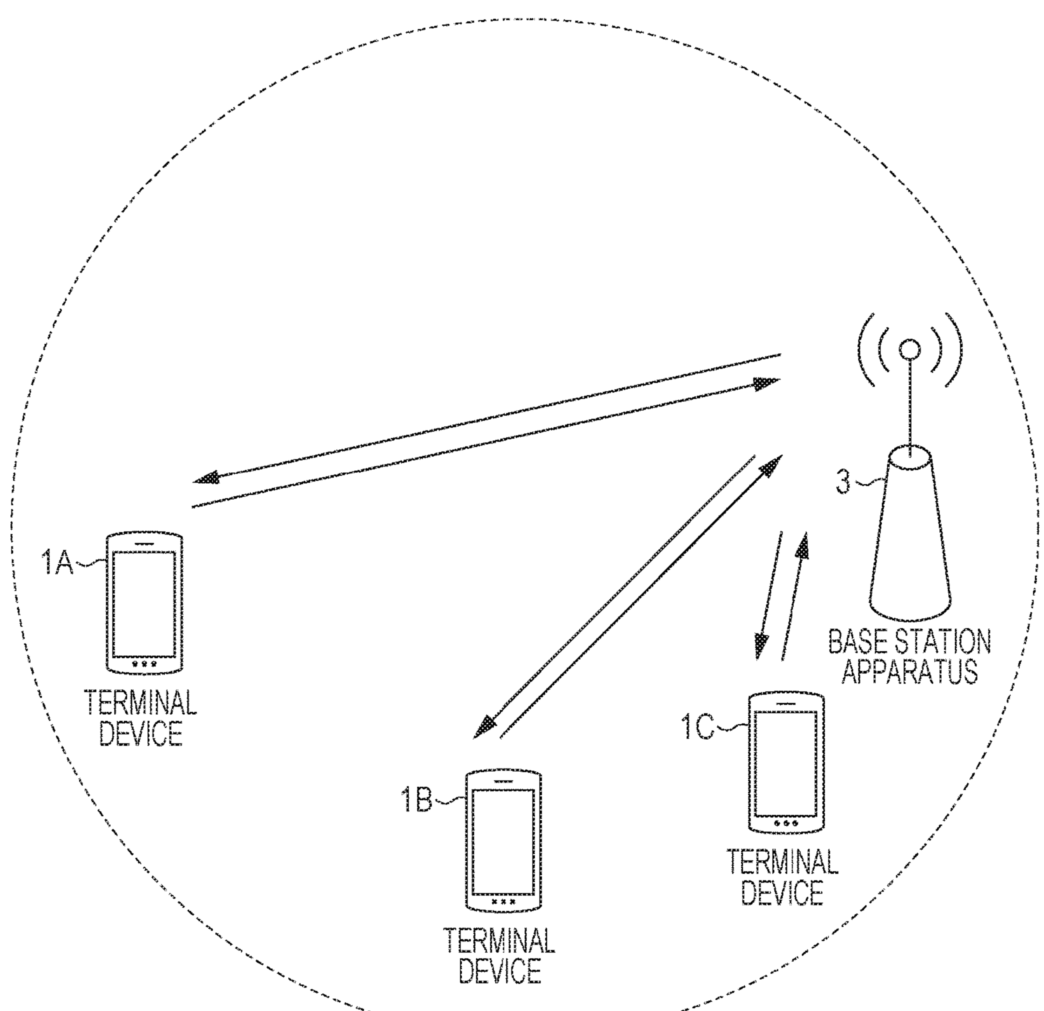
FIG. 1 is a conceptual diagram illustrating a wireless communication system according to an embodiment.

FIG. 1 is a conceptual diagram illustrating a wireless communication system according to the embodiment. In FIG. 1, the wireless communication system includes terminal devices 1A to 1C, and a base station apparatus 3. The terminal devices 1A to 1C are referred below to as a terminal device 1.

A physical channel and a physical signal in the embodiment will be described.

In FIG. 1, in an uplink radio communication from the terminal device 1 to the base station apparatus 3, the following uplink physical channels are used. The uplink physical channels are used for transmitting information output from a higher layer.

Physical uplink control channel (PUCCH)

Physical uplink shared channel (PUSCH)

Physical random access channel (PRACH)

The PUCCH is a physical channel used for transmitting uplink control information (UCI). The uplink control information includes channel state information (CSI) of a downlink, a scheduling request (SR) indicating a request of a PUSCH resource, and acknowledgement (ACK)/negative-acknowledgement (NACK) in response to downlink data (transport block, downlink-shared channel: DL-SCH). ACK/NACK is also referred to as HARQ-ACK, HARQ feedback, or response information.

The channel state information includes a channel quality indicator (CQI), a rank indicator (RI), and a precoding matrix indicator (PMI). The CQI indicates a combination of a modulation scheme and a coding rate for a single transport block transmitted on a PDSCH. The RI indicates the number of useful layers determined by the terminal device 1. The PMI indicates a code book determined by the terminal device 1. The code book is associated with precoding of a PDSCH.

The PUSCH is a physical channel used for transmitting uplink data (uplink-shared channel: UL-SCH). The PUSCH may be used for transmitting HARQ-ACK and/or channel state information along with the uplink data. The PUSCH may be used for transmitting only the channel state information or for transmitting only the HARQ-ACK and the channel state information.

The PRACH is a physical channel used for transmitting a random access preamble.

In FIG. 1, in the uplink radio communication, the following uplink physical signal is used. The uplink physical signal is not used for transmitting information output from a higher layer, but is used by a physical layer.

Uplink reference signal (UL RS)

In the embodiment, the following two types of uplink reference signals are used.

Demodulation reference signal (DMRS)

Sounding reference signal (SRS)

The DMRS is associated with transmission of a PUSCH or a PUCCH. The SRS is not associated with transmission of the PUSCH or the PUCCH.

In FIG. 1, in a downlink radio communication from the base station apparatus 3 to the terminal device 1, the following downlink physical channels are used. The downlink physical channels are used for transmitting information output from a higher layer.

Physical broadcast channel (PBCH)

Physical control format indicator channel (PCFICH)

Physical hybrid automatic repeat request indicator channel (PHICH)

Physical downlink control channel (PDCCH)

Enhanced physical downlink control channel (EPDCCH)

Physical downlink shared channel (PDSCH)

Physical multicast channel (PMCH)

The PBCH is used for broadcasting a master information block (MIB, BCH: broadcast channel) which is commonly used between terminal devices 1. The MIB is transmitted at an interval of 40 ms. The MIB is repeatedly transmitted at a cycle of 10 ms. Specifically, initial transmission of the MIB is performed in the subframe 0 in a radio frame of satisfying SFN mod 4=0, and repetition of the MIB is performed in the subframe 0 in other radio frames. The system frame number (SFN) is the number of a radio frame. The MIB is system information. For example, the MIB includes information indicating the SFN. The PBCH is transmitted on some or all of transmit antenna ports 0 to 3.

The PCFICH is used for transmitting information which is used for performing an instruction of a region (OFDM symbol) used in transmission of a PDCCH.

The PHICH is used for transmitting a HARQ indicator (HARQ feedback, response information) which indicates acknowledgement (ACK)/negative-acknowledgement (NACK) in response to uplink data (uplink shared channel: UL-SCH) received by the base station apparatus 3.

The PDCCH and the EPDCCH are used for transmitting downlink control information (DCI). The downlink control information is also referred to as a DCI format. The downlink control information includes a downlink grant and an uplink grant. The downlink grant is also referred to as downlink assignment or downlink allocation.

The downlink grant is used for scheduling of a single PDSCH in a single cell. The downlink grant is used for scheduling of a PDSCH in a subframe which is the same as a subframe in which the downlink grant is transmitted. The uplink grant is used for scheduling of a single PUSCH in a single cell. The uplink grant is used for scheduling of a single PUSCH in a subframe after 4 subframes or more from a subframe in which the uplink grant is transmitted.

A cyclic redundancy check (CRC) parity bit is attached to a DCI format. The CRC parity bit is scrambled by a cell-radio network temporary identifier (C-RNTI) or a semi persistent scheduling cell-radio network temporary identifier (SPS C-RNTI). The C-RNTI and the SPS C-RNTI are identifiers for identifying a terminal device 1 in a cell. The C-RNTI is used for controlling the PDSCH or the PUSCH in a single subframe. The SPS C-RNTI is used for periodically assigning resources for a PDSCH or a PUSCH.

The PDSCH is used for transmitting downlink data (downlink shared channel: DL-SCH).

The PMCH is used for transmitting multicast data (multicast channel: MCH).

In FIG. 1, in the downlink radio communication, the following downlink physical signals are used. The downlink physical signals are not used for transmitting information output from a higher layer, but used by a physical layer.

Synchronization signal (SS)

Downlink reference signal (DL RS)

The synchronization signal is used when the terminal device 1 performs synchronization between a frequency domain and a time domain of a downlink.

The downlink reference signal is used when the terminal device 1 performs channel correction of a downlink physical channel. The downlink reference signal is used when the terminal device 1 calculates channel state information of the downlink.

In the embodiment, the following five types of downlink reference signals are used.

Cell-specific reference signal (CRS)

URS associated with PDSCH (UE-specific reference signal)

DMRS associated with EPDCCH (demodulation reference signal)

Non-zero power channel state information-reference signal (NZP CSI-RS)

Zero power channel state information-reference signal (ZP CSI-RS)

Multimedia broadcast and multicast service over single frequency network reference signal (MBSFN RS)

Positioning reference signal (PRS)

The CRS is transmitted in the entire band of a subframe. The CRS is used for decoding a PBCH/PDCCH/PHICH/PCFICH/PDSCH. The CRS may be used when the terminal device 1 calculates channel state information of a downlink. The PBCH/PDCCH/PHICH/PCFICH is transmitted on an antenna port which is used for transmitting the CRS.

The URS associated with a PDSCH is transmitted in a subframe and a band which are used for transmitting a PDSCH with which the URS is associated. The URS is used for decoding a PDSCH with which the URS is associated.

The PDSCH is transmitted on an antenna port which is used for transmitting a CRS or a URS. For example, the DCI format 1A is used for scheduling a PDSCH which is transmitted on an antenna port which is used for transmitting a CRS. For example, the DCI format 2B, the DCI format 2C, and the DCI format 2D are used for scheduling a PDSCH which is transmitted on an antenna port which is used for transmitting a URS.

The DMRS associated with an EPDCCH is transmitted in a subframe and a band which are used for transmitting an EPDCCH with which the DMRS is associated. The DMRS is used for decoding an EPDCCH with which the DMRS is associated. The EPDCCH is transmitted on an antenna port which is used for transmitting a DMRS.

The NZP CSI-RS is transmitted in a configured subframe. A resource in which the NZP CSI-RS is transmitted is configured by the base station apparatus. The NZP CSI-RS is used when the terminal device 1 calculates channel state information of a downlink. The terminal device 1 performs signal measurement (channel measurement) by using the NZP CSI-RS. The NZP CSI-RS is transmitted on some or all of transmit antenna ports 15 to 22. The terminal device 1 configures/specifies a transmit antenna port used for transmitting the NZP CSI-RS, based on information which has been received from the base station apparatus 3.

Resources of the ZP CSI-RS are configured by the base station apparatus 3. The base station apparatus 3 transmits the ZP CSI-RS with zero output. That is, the base station apparatus 3 does not transmit the ZP CSI-RS. The base station apparatus 3 does not transmit the PDSCH and the EPDCCH in the configured resources of the ZP CSI-RS. For example, the terminal device 1 can measure interference in a resource corresponding to the NZP CSI-RS, in a certain cell.

The MBSFN RS is transmitted in the entire band of a subframe which is used in transmission of a PMCH. The MBSFN RS is used for demodulating a PMCH. The PMCH is transmitted on an antenna port which is used in transmission of the MBSFN RS.

The PRS may be used for measuring a reference signal time difference (RSTD). The RSTD is defined by a relative timing difference between an adjacent cell and a reference cell.

The downlink physical channel and the downlink physical signal are collectively referred to as downlink signals. The uplink physical channel and the uplink physical signal are collectively referred to as uplink signals. The downlink physical channel and the uplink physical channel are collectively referred to as physical channels. The downlink physical signal and the uplink physical signal are collectively referred to as physical signals.

The BCH, the MCH, the UL-SCH, and the DL-SCH are transport channels. Channels which are used in a medium access control (MAC) layer are referred to as transport channels. A unit of a transport channel which is used in the MAC layer is also referred to as a transport block (TB) or a MAC protocol data unit (PDU). Control of a hybrid automatic repeat request (HARQ) is performed for each transport block in the MAC layer. The transport block is a unit of data which is delivered to a physical layer by the MAC layer. In the physical layer, the transport block is mapped to a code word, and coding processing is performed for each code word.

A structure of a radio frame in the embodiment will be described below.

Figure 2:
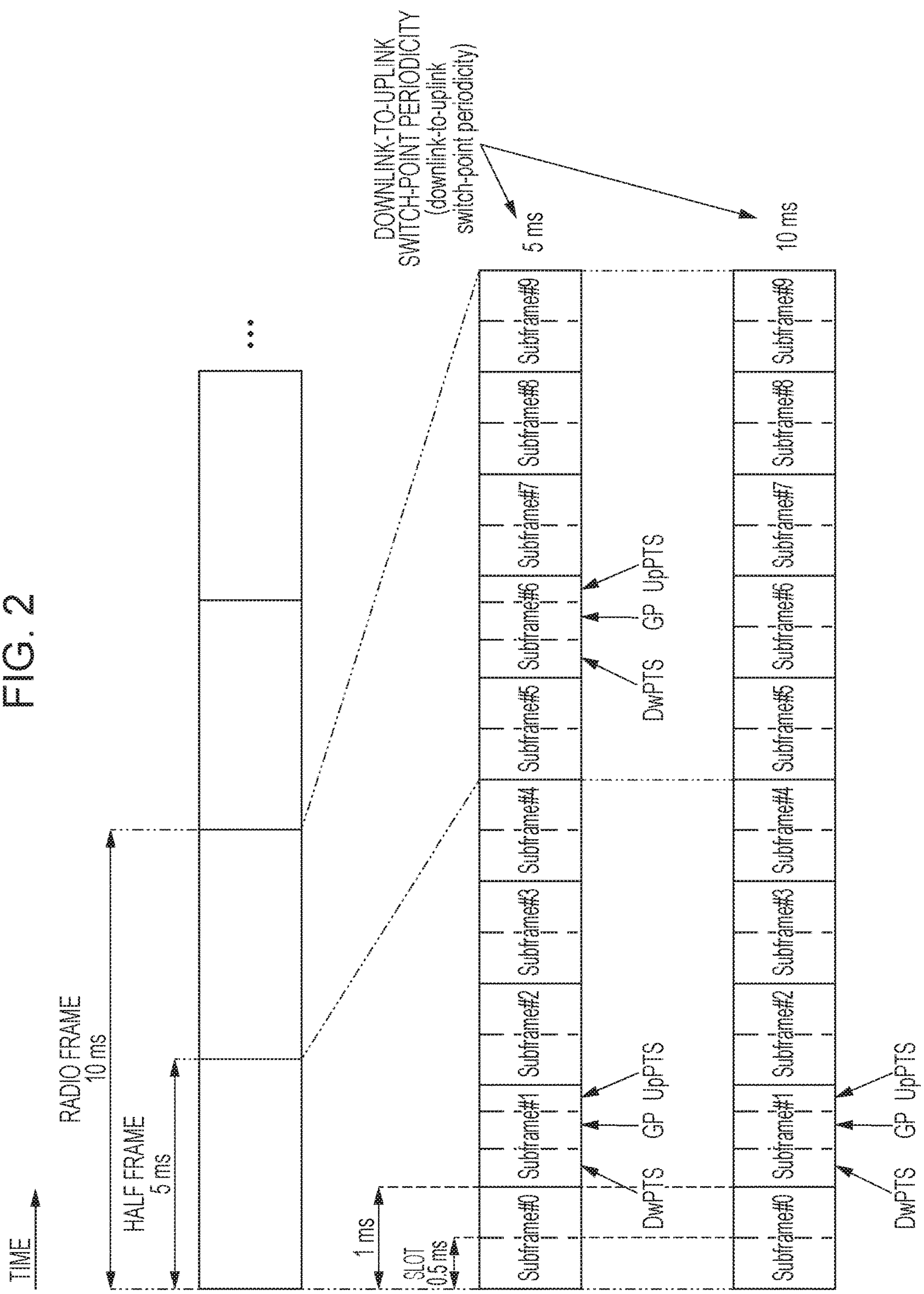
FIG. 2 is a schematic diagram illustrating a structure of a radio frame in the embodiment.

FIG. 2 is a schematic diagram illustrating a structure of a radio frame in the embodiment. Each radio frame has a length of 10 ms. In FIG. 2, a horizontal axis indicates a time axis. Each radio frame is constituted by two half frames. The length of each of the half frames is 5 ms. Each of the half frames is constituted by five subframes. Each of the subframes has a length of 1 ms, and is defined by two consecutive slots. The length of each of the slots is 0.5 ms. An i-th subframe in a radio frame is constituted by a (2×1)th slot and a (2×i+1)th slot. That is, 10 subframes can be used at each internal of 10 ms.

In the embodiment, the following three types of subframes are defined.

Downlink subframe (first subframe)

Uplink subframe (second subframe)

Special subframe (third subframe)

The downlink subframe is a subframe reserved for transmitting a downlink. The uplink subframe is a subframe reserved for transmitting an uplink. The special subframe is constituted from three fields. The three fields are a DwPTS (downlink pilot time slot), a GP (guard period), and an UpPTS (uplink pilot time slot). The total length of the DwPTS, the GP, and the UpPTS are 1 ms. The DwPTS is a field reserved for transmitting a downlink. The UpPTS is a field reserved for transmitting an uplink. The GP is a field in which downlink transmission and uplink transmission are not performed. The special subframe may be constituted only by the DwPTS and the GP, or may be constituted only by the GP and the UpPTS.

A single radio frame is constituted by at least a downlink subframe, an uplink subframe, and a special subframe.

The wireless communication system in the embodiment supports downlink-to-uplink switch-point periodicity of 5 ms and 10 ms. In a case where the downlink-to-uplink switch-point periodicity is 5 ms, a special subframe is included in both of half frames in a radio frame. In a case where the downlink-to-uplink switch-point periodicity is 10 ms, a special subframe is included only in a first half frame in the radio frame.

A structure of a slot in the embodiment will be described below.

Figure 3:
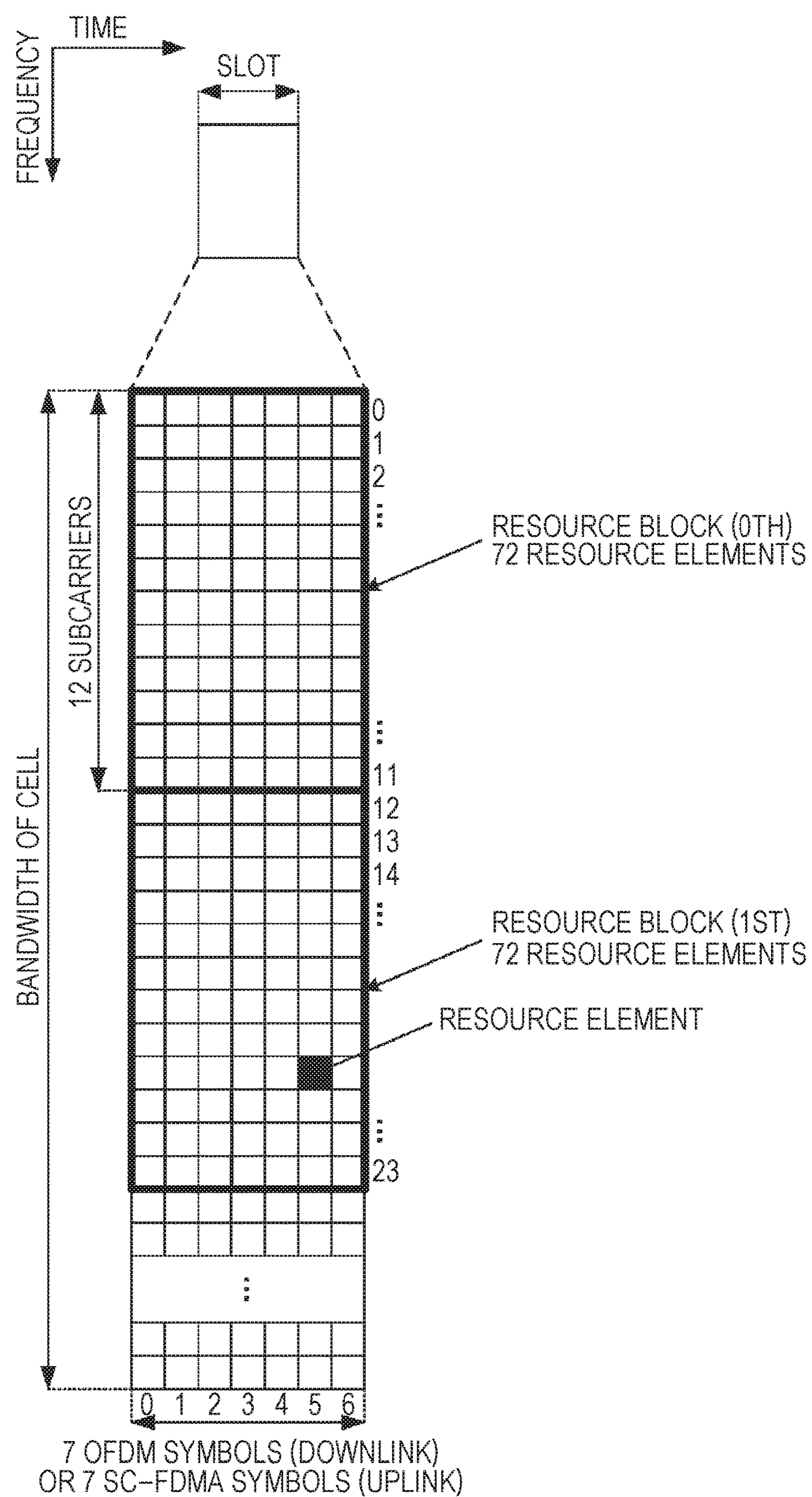
FIG. 3 is a diagram illustrating a structure of a slot in the embodiment.

FIG. 3 is a diagram illustrating a structure of a slot in the embodiment. In the embodiment, a normal cyclic prefix (normal CP) is applied to an OFDM symbol. An extended cyclic prefix (extended CP) may be applied to an OFDM symbol. A physical signal or a physical channel transmitted in each slot is expressed by resource grid. In FIG. 3, a horizontal axis indicates a time axis and a vertical axis indicates a frequency axis. The resource grid in a downlink is defined by a plurality of subcarriers and a plurality of OFDM symbols. The resource grid in an uplink is defined by a plurality of subcarriers and a plurality of SC-FDMA symbols. The number of subcarriers constituting one slot depends on a bandwidth of a cell. The number of OFDM symbols or SC-FDMA symbols constituting one slot is 7. Each element in the resource grid is referred to as a resource element. The resource element is identified by using a subcarrier number, and an OFDM symbol number or a SC-FDMA symbol number.

A resource block is used for expressing mapping to a resource element of a certain physical channel (PDSCH, PUSCH, or the like). In the resource block, a virtual resource block and a physical resource block are defined. A certain physical channel is firstly mapped to the virtual resource block. Then, the virtual resource block is mapped to the physical resource block. One physical resource block is defined by seven continuous OFDM symbols or SC-FDMA symbols in the time domain, and twelve continuous subcarriers in the frequency domain. Thus, one physical resource block is constituted by (7×12) resource elements. One physical resource block corresponds to one slot in the time domain, and corresponds to 180 kHz in the frequency domain. The physical resource block is numbered from 0 in the frequency domain.

Figure 4:
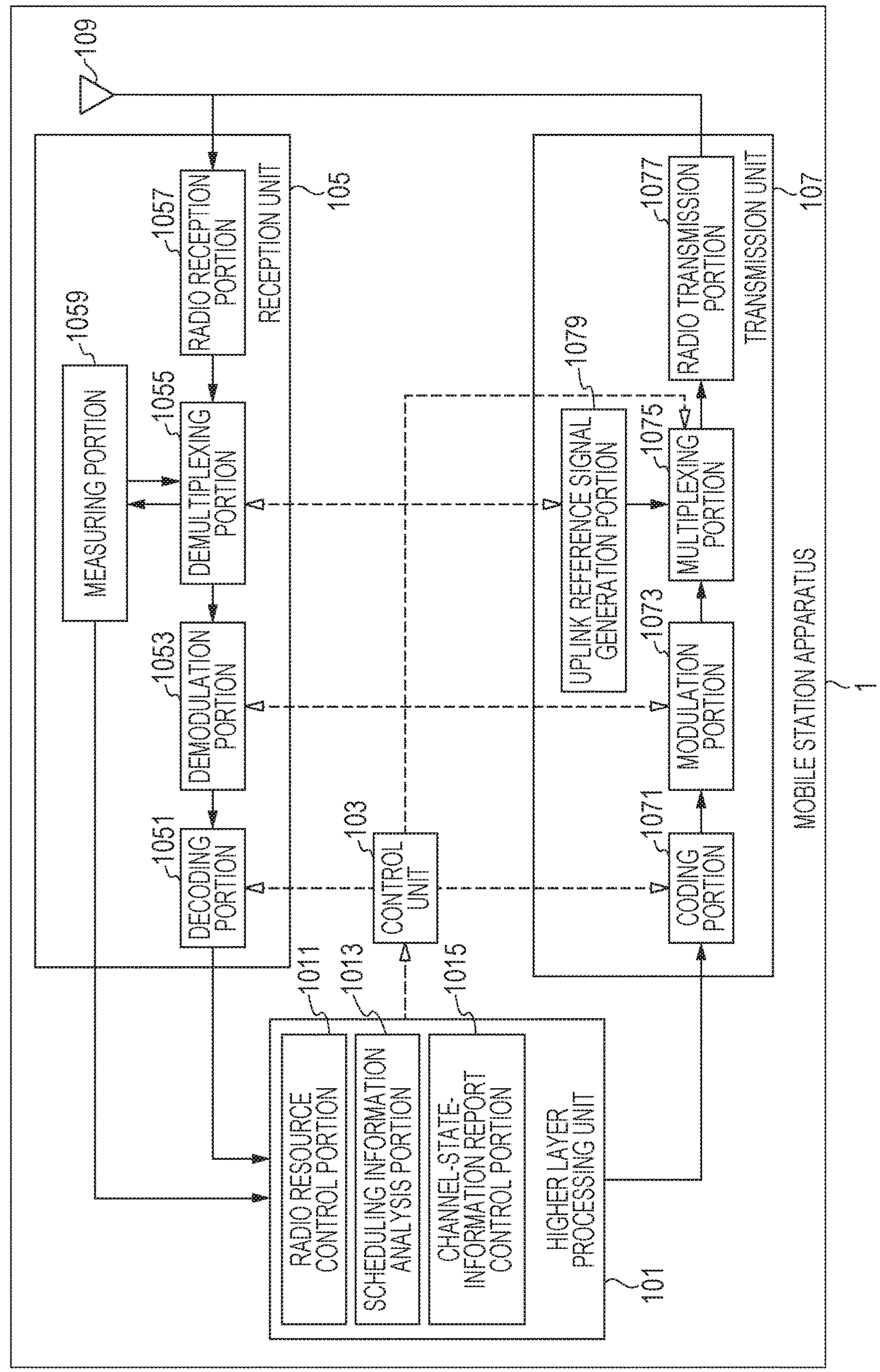
FIG. 4 is a schematic block diagram illustrating a structure of a terminal device 1 according to the embodiment.

FIG. 4 is a schematic block diagram illustrating a structure of the terminal device 1 in the embodiment. As illustrated in FIG. 4, the terminal device 1 includes a higher layer processing unit 101, a control unit 103, a reception unit 105, a transmission unit 107, and a transmit and receive antenna 109. The higher layer processing unit 101 includes a radio resource control portion 1011, a scheduling information analysis portion 1013, and a channel state information (CSI) report control portion 1015. The reception unit 105 includes a decoding portion 1051, a demodulation portion 1053, a demultiplexing portion 1055, a radio reception portion 1057, and a measuring portion 1059. The transmission unit 107 includes a coding portion 1071, a modulation portion 1073, a multiplexing portion 1075, a radio transmission portion 1077, and an uplink reference signal generation portion 1079.

The higher layer processing unit 101 outputs uplink data (transport block) which has been generated by an operation and the like of a user, to the transmission unit 107. The higher layer processing unit 101 performs processing of a medium access control (MAC) layer, a packet data convergence protocol (PDCP) layer, a radio link control (RLC) layer, and a radio resource control (RRC) layer.

The radio resource control portion 1011 in the higher layer processing unit 101 manages various types of setting information of the own terminal device. The radio resource control portion 1011 generates information allocated to each channel of an uplink, and outputs the generated information to the transmission unit 107.

The scheduling information analysis portion 1013 in the higher layer processing unit 101 analyzes a DCI format (scheduling information) which has been received through the reception unit 105. The scheduling information analysis portion 1013 generates control information for controlling the reception unit 105 and the transmission unit 107, based on a result obtained by analyzing the DCI format. The scheduling information analysis portion 1013 outputs the generated control information to the control unit 103.

The CSI report control portion 1015 instructs the measuring portion 1059 to derive channel state information (RI/PMI/CQI) associated with a CSI reference resource. The CSI report control portion 1015 instructs the transmission unit 107 to transmit the RI/PMI/CQI. The CSI report control portion 1015 sets a configuration used when the measuring portion 1059 calculates the CQI.

The control unit 103 generates control signals for controlling the reception unit 105 and the transmission unit 107, based on the control information from the higher layer processing unit 101. The control unit 103 outputs the generated control signals to the reception unit 105 and the transmission unit 107, so as to control the reception unit 105 and the transmission unit 107.

The reception unit 105 separates, demodulates, and decodes a reception signal received from the base station apparatus 3 through the transmit and receive antenna 109, in accordance with a control signal input from the control unit 103. The reception unit 105 outputs the decoded information to the higher layer processing unit 101.

The radio reception portion 1057 performs down conversion on a downlink signal received through the transmit and receive antenna 109 into a signal of an intermediate frequency. The radio reception portion 1057 removes an unnecessary frequency component, and controls an amplification level to cause the signal levels to be appropriately maintained. The radio reception portion 1057 performs quadrature demodulation based on the in-phase components and the quadrature components of the received signal, and converts the quadrature-demodulated analog signal to a digital signal. The radio reception portion 1057 removes a portion corresponding to a guard interval (GI), from the converted digital signal. The radio reception portion 1057 performs fast Fourier transform (FFT) on the signal with the guard interval removed, and extracts a signal of the frequency domain.

The demultiplexing portion 1055 separates the extracted signal into a PHICH, a PDCCH, an EPDCCH, a PDSCH, and a downlink-reference signal. The demultiplexing portion 1055 performs channel compensation on the PHICH, the PDCCH, the EPDCCH, and the PDSCH based on an estimation value of the channel which has been input from the measuring portion 1059. The demultiplexing portion 1055 outputs the separated downlink reference signal to the measuring portion 1059.

The demodulation portion 1053 performs synthesis by multiplying a corresponding sign by a PHICH, and demodulates a signal obtained by the synthesis by using the binary phase shift keying (BPSK) modulation scheme. The demodulation portion 1053 outputs a resultant of the demodulation to the decoding portion 1051. The decoding portion 1051 decodes a PHICH of the terminal device 1, and outputs the decoded HARQ indicator to the higher layer processing unit 101. The demodulation portion 1053 demodulates a PDCCH and/or an EPDCCH by using the QPSK modulation scheme, and outputs the demodulated PDCCH and/or EPDCCH to the decoding portion 1051. In a case where attempt to decode the PDCCH and/or EPDCCH is performed, the attempt to decoding succeeds, the decoding portion 1051 outputs the demodulated downlink control information and a RNTI corresponding to the downlink control information, to the higher layer processing unit 101.

The demodulation portion 1053 demodulates the PDSCH by using a modulation scheme such as quadrature phase shift keying (QPSK), quadrature amplitude modulation (16QAM), and 64QAM, of which a notification is performed by a downlink grant. The demodulation portion 1053 outputs the demodulated PDSCH to the decoding portion 1051. The decoding portion 1051 performs decoding based on information regarding a coding rate of which a notification is performed by the downlink control information. The decoding portion 1051 outputs the decoded downlink data (transport block) to the higher layer processing unit 101.

The measuring portion 1059 performs measurement of path loss of a downlink, channel measurement, and/or interference measurement, based on the downlink reference signal which has been output from the demultiplexing portion 1055. The measuring portion 1059 outputs the channel state information which has been calculated based on a measurement result, and the measurement result to the higher layer processing unit 101. The measuring portion 1059 calculates an estimation value of a channel of the downlink from the downlink reference signal, and outputs the calculated value to the demultiplexing portion 1055.

The transmission unit 107 generates an uplink reference signal in accordance with the control signal which has been input from the control unit 103. The transmission unit 107 codes and modulates uplink data (transport block) input from the higher layer processing unit 101. The transmission unit 107 multiplexes the PUCCH, the PUSCH, and the generated uplink reference signal, and outputs a result of the multiplexing to the base station apparatus 3 through the transmit and receive antenna 109.

The coding portion 1071 codes uplink control information and uplink data which have been input from the higher layer processing unit 101. The modulation portion 1073 modulates the coding bit which has been input from the coding portion 1071 by using a modulation scheme such as BPSK, QPSK, 16QAM, and 64QAM.

The uplink reference signal generation portion 1079 generates a sequence obtained by a predetermined rule (expression), based on a physical cell identity (referred to as PCI, Cell ID, and the like) for identifying the base station apparatus 3, a bandwidth for mapping an uplink reference signal, a cyclic shift of which a notification is performed by using an uplink grant, a value of a parameter for generating a DMRS sequence, and the like.

The multiplexing portion 1075 determines the number of layers for a PUSCH, which are subjected to spatial multiplexing, based on information which is used for scheduling a PUSCH. The multiplexing portion 1075 maps plural pieces of uplink data which are transmitted on the same PUSCH by using multiple input multiple output spatial multiplexing (MIMO SM), to a plurality of layers, and performs precoding on the layer.

The multiplexing portion 1075 performs discrete Fourier transform (DFT) on modulation symbols of a PUSCH, in accordance with the control signal input from the control unit 103. The multiplexing portion 1075 multiplexes signals of a PUCCH and a PUSCH, and the generated uplink reference signal for each transmit antenna port. That is, the multiplexing portion 1075 maps the signals of the PUCCH and the PUSCH, and the generated uplink reference signal on resource elements for each transmit antenna port.

The radio transmission portion 1077 performs inverse fast Fourier transform (IFFT) on the multiplexed signals, and performs modulation of the SC-FDMA scheme. The radio transmission portion 1077 appends a guard interval to a SC-FDMA symbol obtained by SC-FDMA modulation, and generates a baseband digital signal. The radio transmission portion 1077 converts the generated baseband digital signal into an analog signal, generates the in-phase components and the quadrature components of the intermediate frequency from the analog signal, and removes excessive frequency components from the intermediate frequency band. The radio transmission portion 1077 converts (up-converts) a signal of the intermediate frequency into a signal of a high frequency, and removes an excessive frequency component. The radio transmission portion 1077 amplifies power, and outputs and transmits the power-amplified signal to the transmit and receive antenna 109.

FIG. 5 is a schematic block diagram illustrating a structure of the base station apparatus 3 in the embodiment. As illustrated in FIG. 5, the base station apparatus 3 includes a higher layer processing unit 301, a control unit 303, a reception unit 305, a transmission unit 307, and a transmit and receive antenna 309. The higher layer processing unit 301 includes a radio resource control portion 3011, a scheduling portion 3013, and a CSI report control portion 3015. The reception unit 305 includes a decoding portion 3051, a demodulation portion 3053, a demultiplexing portion 3055, a radio reception portion 3057, and a measuring portion 3059. The transmission unit 307 includes a coding portion 3071, a modulation portion 3073, a multiplexing portion 3075, a radio transmission portion 3077, and a downlink reference signal generation portion 3079.

The higher layer processing unit 301 performs processing of a medium access control (MAC) layer, a packet data convergence protocol (PDCP) layer, a radio link control (RLC) layer, and a radio resource control (RRC) layer. The higher layer processing unit 301 generates control information for controlling the reception unit 305 and the transmission unit 307, and outputs the generated control information to the control unit 303.

The radio resource control portion 3011 in the higher layer processing unit 301 generates or acquires downlink data (transport block) mapped on a PDSCH of a downlink, system information, an RRC message, an MAC control element (CE), and the like, from a higher node. The radio resource control portion 3011 outputs a result of the generation or the acquisition to the transmission unit 307, and manages various types of setting information of each terminal device 1.

The scheduling portion 3013 in the higher layer processing unit 301 determines a frequency and a subframe to which the physical channels (PDSCH and PUSCH) are allocated, the coding rate and the modulation scheme of the physical channels (PDSCH and PUSCH), transmitted power, and the like, based on the received channel state information, the estimation value of the channel or the channel quality which has been input from the measuring portion 3059, and the like. The scheduling portion 3013 generates control information for controlling the reception unit 305 and the transmission unit 307, based on a scheduling result. The scheduling portion 3013 outputs the generated information to the control unit 303. The scheduling portion 3013 generates information (for example, DCI format) used for scheduling the physical channels (PDSCH and PUSCH), based on the scheduling result.

The CSI report control portion 3015 in the higher layer processing unit 301 controls CSI report of the terminal device 1. The CSI report control portion 3015 transmits information which is assumed when the terminal device 1 derives a RI/PMI/CQI in the CSI reference resource, and indicates various settings, to the terminal device 1 through the transmission unit 307.

The control unit 303 generates control signals for controlling the reception unit 305 and the transmission unit 307, based on control information from the higher layer processing unit 301. The control unit 303 outputs the generated control signals to the reception unit 305 and the transmission unit 307 so as to control the reception unit 305 and the transmission unit 307.

The reception unit 305 outputs information obtained by separating, demodulating, and decoding a reception signal which has been received from the terminal device 1 through the transmit and receive antenna 309, to the higher layer processing unit 301 in accordance with the control signal which has been input from the control unit 303. The radio reception portion 3057 converts (down-converts) an uplink signal which has been received through the transmit and receive antenna 309, into a signal of an intermediate frequency. The radio reception portion 3057 removes an unnecessary frequency component, and controls an amplification level to cause the signal levels to be appropriately maintained. The radio reception portion 3057 performs quadrature demodulation based on the in-phase components and the quadrature components of the received signal, and converts the quadrature-demodulated analog signal to a digital signal.

The radio reception portion 3057 removes a portion corresponding to a guard interval (GI), from the converted digital signal. The radio reception portion 3057 performs fast Fourier transform (FFT) on the signal with the guard interval removed, extracts a signal of the frequency domain, and outputs the extracted signal to the demultiplexing portion 3055.

The demultiplexing portion 1055 separates the signal input from the radio reception portion 3057 into signals of a PUCCH, a PUSCH, an uplink reference signal, and the like. The separation is performed based on assignment information of radio resources, which is determined in advance by the radio resource control portion 3011 of the base station apparatus 3, and is included in an uplink grant of which each terminal device 1 is notified. The demultiplexing portion 3055 performs channel compensation on the PUCCH and the PUSCH based on an estimation value of the channel which has been input from the measuring portion 3059. The demultiplexing portion 3055 outputs the separated uplink reference signal to the measuring portion 3059.

The demodulation portion 3053 performs inverse discrete Fourier transform (IDFT) on the PUSCH and acquires modulation symbols. The demodulation portion 3053 demodulates a reception signal by using a modulation scheme determined in advance, such as binary phase shift keying (BPSK), QPSK, 16QAM, or 64QAM, or by using a modulation scheme of which each terminal device 1 is notified with an uplink grant in advance by the own apparatus, for each of the modulation symbols of the PUCCH and the PUSCH. The demodulation portion 3053 separates modulation symbols of plural pieces of uplink data which have been transmitted on the same PUSCH by using MIMO SM. The separation is performed based on the number of spatially-multiplexed sequences of which each terminal device 1 is notified in advance by using an uplink grant, and on information for an instruction of precoding which is performed on the sequences.

The decoding portion 3051 decodes coding bits of the demodulated PUCCH and PUSCH at a coding rate. The coding rate is predetermined in predetermined coding scheme or a notification of the coding rate of the predetermined coding scheme is performed to the terminal device 1 in advance by the own apparatus, in the uplink grant.

The decoding portion 3051 outputs the decoded uplink data and the decoded uplink control information to the higher layer processing unit 101. In a case where the PUSCH is repeated retransmitted, the decoding portion 3051 performs decoding by using the coding bit which is held in a HARQ buffer and is input from the higher layer processing unit 301, and by using the demodulated coding bit. The measuring portion 309 measures an estimation value of a channel, quality of the channel, and the like from the uplink reference signal input from the demultiplexing portion 3055, and outputs a result of the measurement to the demultiplexing portion 3055 and the higher layer processing unit 301.

The transmission unit 307 generates a downlink reference signal, in accordance with the control signal which has been input from the control unit 303. The transmission unit 307 codes and modulates the HARQ indicator, the downlink control information, and the downlink data which have been input from the higher layer processing unit 301. The transmission unit 307 multiplexes the PHICH, PDCCH, the EPDCCH, the PDSCH, and the downlink reference signal, and transmits a signal obtained by multiplexing, to the terminal device 1 through the transmit and receive antenna 309.

The coding portion 3071 codes the HARQ indicator, the downlink control information, and the downlink data which have been input from the higher layer processing unit 301. The modulation portion 3073 modulates the coding bit which has been input from the coding portion 3071, by using the modulation scheme such as BPSK, QPSK, 16QAM, and 64QAM.

The downlink reference signal generation portion 3079 generates a sequence which is obtained by a rule determined in advance based on the physical cell identity (PCI) or the like for identifying the base station apparatus 3 and is known to the terminal device 1, as the downlink reference signal.

The multiplexing portion 3075 maps one or plural pieces of downlink data transmitted on one PUSCH, to one or a plurality of layers, in accordance with the number of spatially-multiplexed layers of the PDSCH. The multiplexing portion 3075 performs precoding on the one or the plurality of layers. The multiplexing portion 375 performs multiplexing of the signal of the downlink physical channel and the downlink reference signal for each of the transmit antenna ports. The multiplexing portion 375 maps the signal of the downlink physical channel and the downlink reference signal to resource elements for each of the transmit antenna ports.

The radio transmission portion 3077 performs inverse fast Fourier transform (IFFT) on the multiplexed modulation symbols and the like, so as to perform modulation of the OFDM scheme. The radio transmission portion 3077 appends a guard interval to an OFDM symbol obtained by OFDM modulation, and generates a baseband digital signal. The radio transmission portion 3077 converts the baseband digital signal into an analog signal, generates the in-phase components and the quadrature components of the intermediate frequency from the analog signal, and removes excessive frequency components from the intermediate frequency band. The radio transmission portion 3077 converts (up-converts) a signal of the intermediate frequency into a signal of a high frequency, and removes an excessive frequency component. The radio transmission portion 3077 amplifies power, and outputs and transmits the power-amplified signal to the transmit and receive antenna 309.

Figure 6:
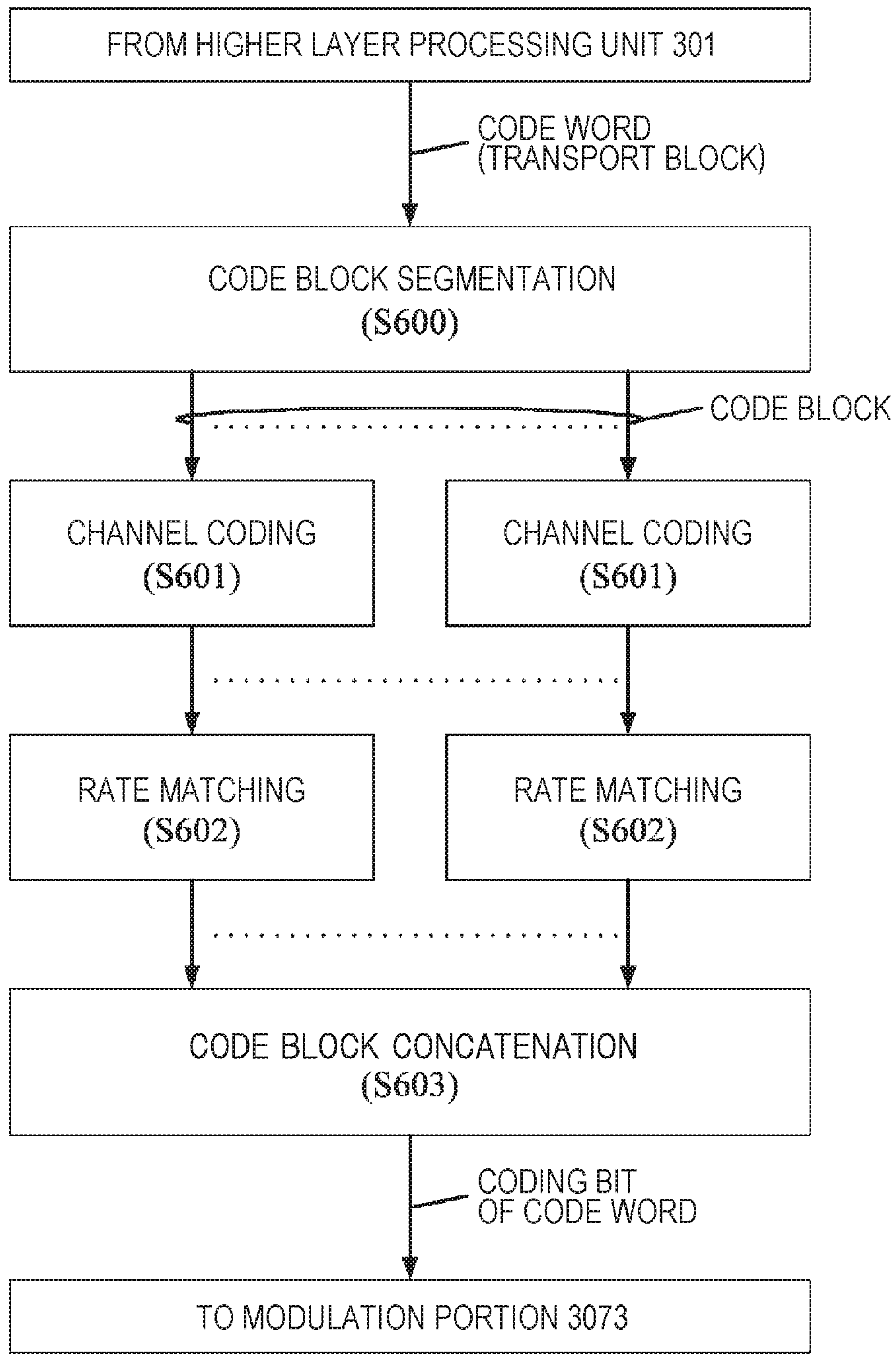
FIG. 6 is a diagram illustrating an example of processing in a coding portion 3071 in the embodiment.

FIG. 6 is a diagram illustrating an example of processing in the coding portion 3071 in the embodiment. The coding portion 3071 may apply the processing in FIG. 6 to each transport block. One transport block is mapped on one code word. That is, coding of a transport block has the same meaning as coding of a code word.

The coding portion 3071 appends the corresponding CRC parity bit to one code word which has been input from the higher layer processing unit 301. Then, the coding portion 3071 divides the code word into one or a plurality of code blocks (S600). The corresponding CRC parity bit may be appended to each of the code blocks.

The one code block or each of the plurality of code blocks are coded (for example, turbo coding or convolutional coding) (S601). Rate matching is applied to each sequence of coding bits of the code block (S602). The one or the plurality of code blocks to which the rate matching is applied are concatenated to each other, thereby a sequence of coding bits of a code word is obtained (S603). The sequence of coding bits of a code word is output to the modulation portion 3073.

Figure 7:
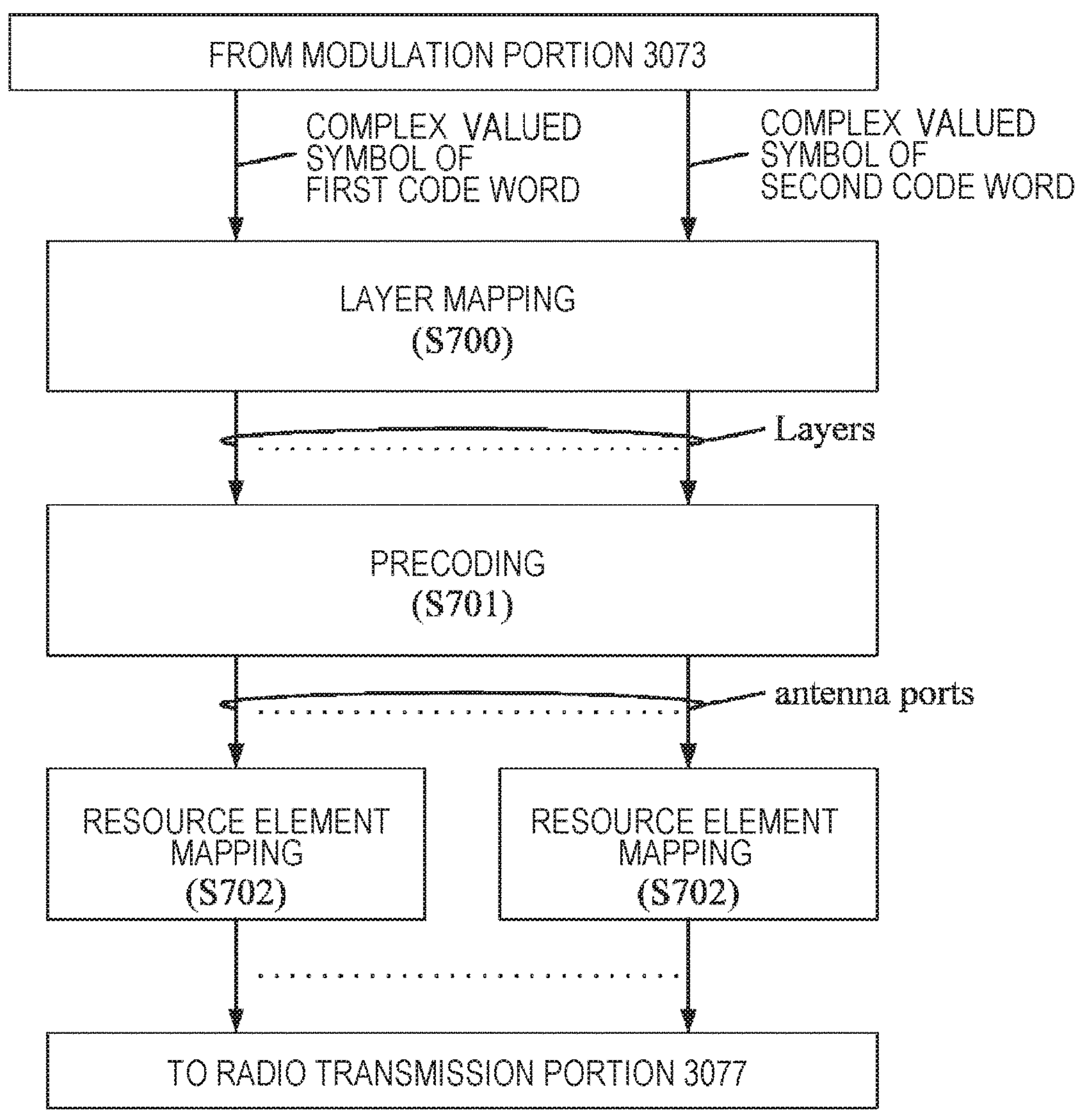
FIG. 7 is a diagram illustrating an example of processing in a multiplexing portion 3075 in the embodiment.

FIG. 7 is a diagram illustrating an example of processing in the multiplexing portion 3075 in the embodiment. The multiplexing portion 3075 maps a complex valued symbol of a first code word and a complex valued symbol of a second code word on one or a plurality of layers (S700). The first code word and the second code word have been input from the modulation portion 3073. Only the complex valued symbol of the first code word may be input from the modulation portion 3073. The number of code words to be input is the same as the number of layers or is less than the number of layers.

Precoding is applied to the complex valued symbol mapped on the layer (S701). The precoding causes sequences of complex valued symbols of which the number is the same as the number of corresponding transmit antenna ports to be generated. The number of layers is the same as the number of transmit antenna ports corresponding to transmission of the PDSCH or less than the number of transmit antenna ports. A complex valued symbol to which the precoding is applied is mapped on a resource element for each of the transmit antenna ports corresponding to transmission of the PDSCH (S702).

The terminal device 1 configures a transmission mode for PDSCH transmission, based on information which has been received from the base station apparatus 3. The terminal device 1 is configured in accordance with the transmission mode, by a higher layer such that the terminal device 1 receives PDSCH data transmission subjected to signaling, through a PDCCH. The terminal device 1 selects a DCI format to be monitored, in accordance with the transmission mode. The terminal device 1 specifies a transmission scheme of a PDSCH, which corresponds to the received DCI format, in accordance with the transmission mode and the DCI format.

FIG. 8 is a diagram illustrating an example of a correspondence between the transmission mode, the DCI format, and the transmission scheme of a PDSCH, in the embodiment. A column of P800 in FIG. 8 indicates a transmission mode. A column of P801 in FIG. 8 indicates a DCI format. A column of P802 in FIG. 8 indicates a transmission scheme of a PDSCH corresponding to a PDCCH, and the number of layers supported by the transmission scheme of the PDSCH. For example, in FIG. 8, in a case where the terminal device 1 configures the transmission mode 4, and receives the DCI format 2 on the PDCCH, the transmission scheme of the PDSCH corresponding to the PDCCH is closed-loop spatial multiplexing (up to 4 layers) or transmit diversity (1 layer). Information included in the DCI format 2 indicates either of the closed-loop spatial multiplexing and the transmit diversity. Information included in the DCI format 2 indicates the number of layers subjected to spatial multiplexing.

The terminal device 1 transmits capability information (UECapabilityInformation) to the base station apparatus 3. The base station apparatus 3 configures the terminal device 1 and performs scheduling for the terminal device 1, in accordance with the capability information.

The capability information may include a plurality of capability parameters (UE radio access capability parameters). One capability parameter corresponds to one function or one function group. One capability parameter may indicate whether or not a test of the corresponding function or the corresponding function group succeeds. One capability parameter may indicate whether or not the terminal device 1 supports the corresponding function or the corresponding function group. The capability information is information of an RRC layer. The capability parameter is a parameter of the RRC layer.

The capability information may include one or a plurality of capability parameters which indicate an UE category. The capability information may include one capability parameter indicating one downlink UE category. In the embodiment, the downlink UE category is defined separately from an UE category. The UE category and the downlink UE category respectively correspond to the total number of DL-SCH soft channel bits, and the maximum number of layers supported for spatial multiplexing in a downlink. The total number of the DL-SCH soft channel bits is the total number of soft channel bits which are available for HARQ processing of a DL-SCH.

FIG. 9 is a diagram illustrating an example of an UE category in the embodiment. A column of P900 in FIG. 9 indicates a capability parameter which indicates an UE category. A column of P901 in FIG. 9 indicates an UE category which is indicated by the capability parameter. A column of P902 in FIG. 9 indicates the total number of DL-SCH soft channel bits corresponding to the UE category. A column of P903 in FIG. 9 indicates the maximum number of layers supported for spatial multiplexing in the downlink, which corresponds to the UE category. A capability parameter ue-Category (without suffix) indicates one of UE categories 1 to 5. A capability parameter ue-Category-v1020 indicates one of UE categories 6 to 8. A capability parameter ue-Category-v1170 indicates one of UE categories 9 and 10. A capability parameter ue-Category-v11a0 indicates one of UE categories 11 and 12.

FIG. 10 is a diagram illustrating an example of the downlink UE category in the embodiment. A column of P1000 in FIG. 10 indicates a capability parameter which indicates a downlink UE category. A column of P1001 in FIG. 10 indicates a downlink UE category which is indicated by the capability parameter. A column of P1002 in FIG. 10 indicates the total number of DL-SCH soft channel bits corresponding to the downlink UE category. A column of P1003 in FIG. 10 indicates the maximum number of layers supported for spatial multiplexing in the downlink, which corresponds to the downlink UE category. A capability parameter ue-CategoryDL-r12 indicates one of downlink UE categories 0, 6, 7, 9, 10, 11, 12, 13, and 14.

FIG. 11 is a diagram illustrating an example of a combination of categories indicated by a plurality of capability parameters in the embodiment. Case 9 in FIG. 11 presents that the capability parameter ue-Category-v1020 indicates the UE category 6 and the capability parameter ue-Category (without suffix) indicates the UE category 4 in a case where the capability parameter ue-CategoryDL-r12 indicates the downlink UE category 9.

The capability information may include a capability parameter supportedBandCombination which indicates carrier aggregation and MIMO supported by the terminal device 1. The capability parameter supportedBandCombination indicates one or a plurality of band combinations. The one band combination includes one or a plurality of bands. The one band includes one or a plurality of combinations of a supported bandwidth class and MIMO capability for a downlink. That is, the terminal device 1 provides MIMO capability for a downlink to the base station apparatus 3, for each bandwidth class in each band in each combination of a band specified by the capability parameter supportedBandCombination. The MIMO capability for a downlink indicates the maximum number of layers supported by the terminal device 1, and is applied to all of component carriers (cells) corresponding to the bandwidth class.

The bandwidth class corresponds to aggregated transmission bandwidth configurations and the number of component carriers which are supported for the bandwidth class by the terminal device 1. The aggregated transmission bandwidth configurations are defined by the total number of resource blocks which are included in an aggregated component carrier in the corresponding band. A plurality of component carriers corresponding to the bandwidth class is contiguous in the frequency domain. A guard band of 300 kHz or smaller may be provided between the contiguous component carriers in the frequency domain. In a case where the number of component carriers corresponding to the bandwidth class is 2, two contiguous component carriers in the frequency domain are supported by the terminal device 1. A guard band having a value which is equal to or smaller than a prescribed value may be provided between the two contiguous component carriers. Here, the prescribed value may be 300 KHz.

FIG. 12 is a diagram illustrating an example of the bandwidth class in the embodiment. In FIG. 12, in a case where the bandwidth class is C, the number of the aggregated transmission bandwidth configurations is larger than 25, and is equal to or smaller than 100. The maximum number of component carriers is 2.

Figure 13:
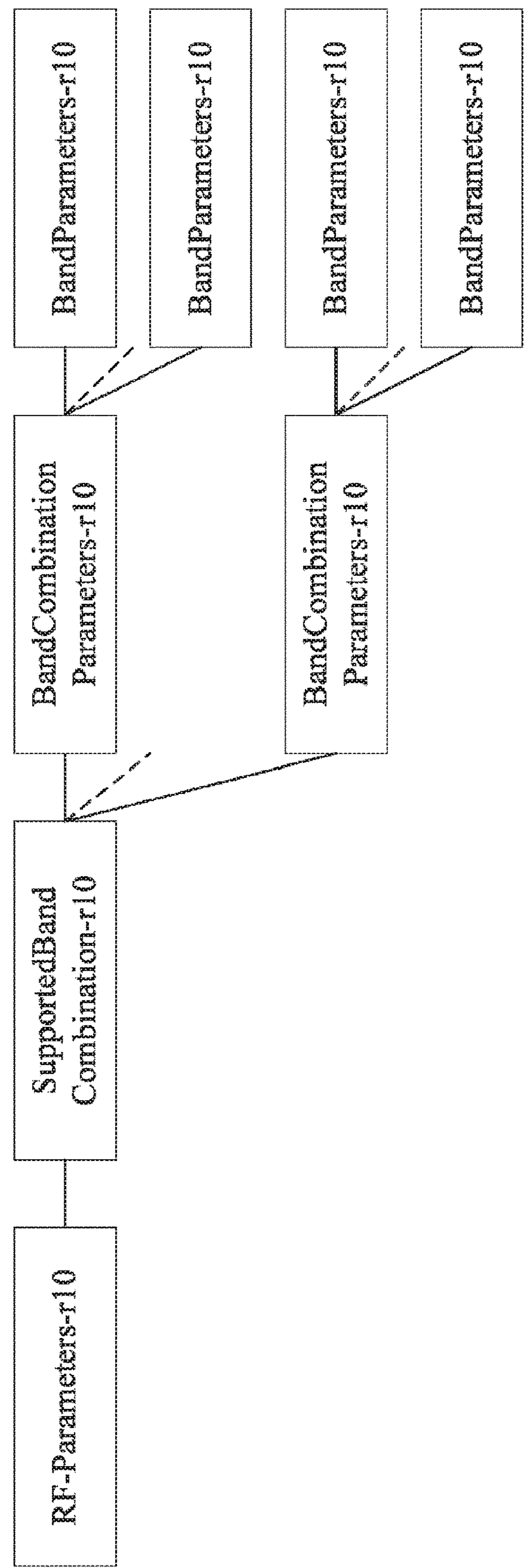
FIG. 13 is a diagram illustrating an example of a structure of a capability parameter supportedBandCombination in the embodiment.
Figure 14:
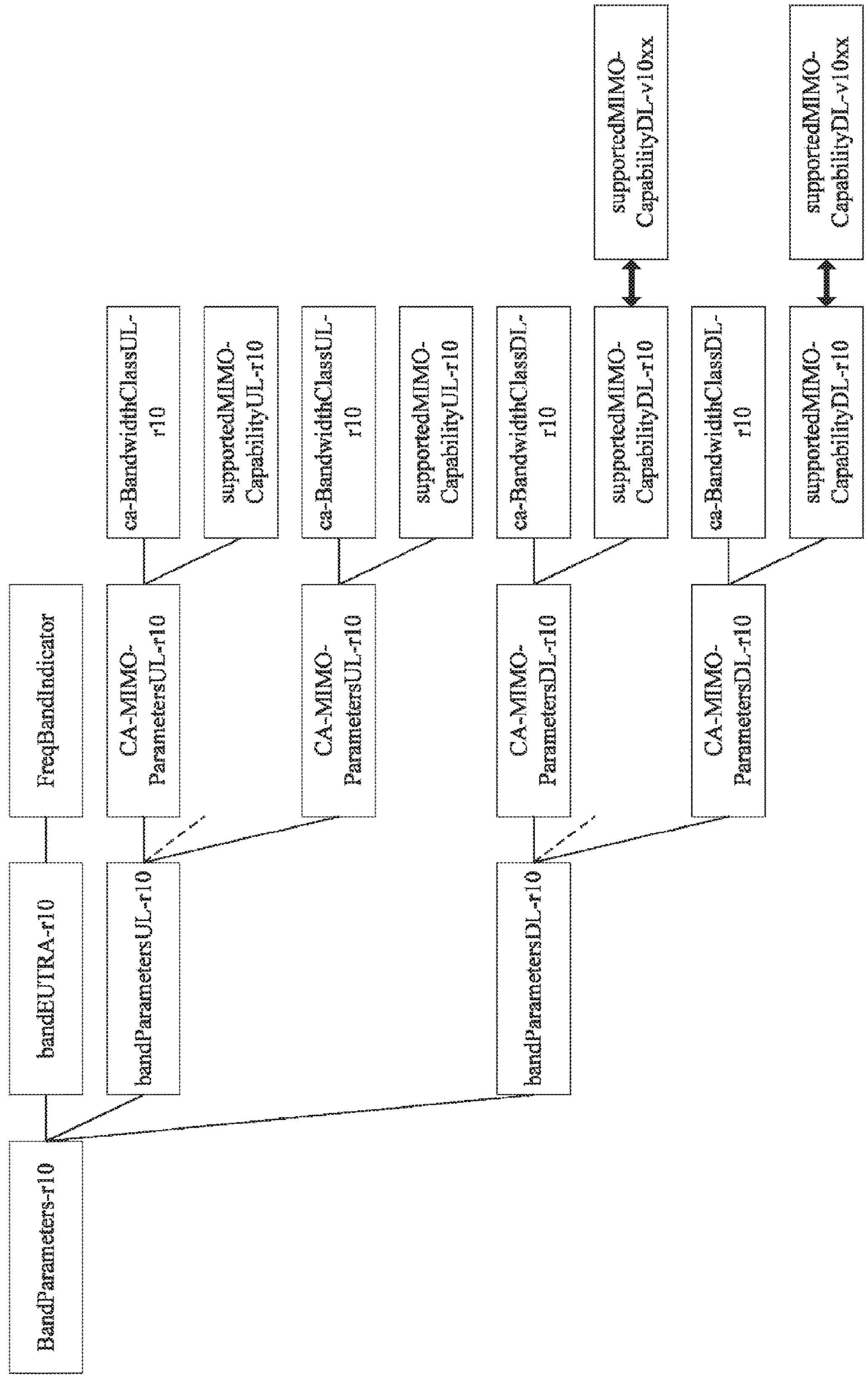
FIG. 14 is a diagram illustrating an example of a structure of the capability parameter supportedBandCombination in the embodiment.

FIGS. 13 and 14 are diagrams illustrating an example of a structure of the capability parameter supportedBandCombination in the embodiment. The capability parameter supportedBandCombination is included in the capability parameter RF-Parameters-r10. The capability parameter supportedBandCombination includes one or a plurality of parameters BandCombinationParameters-r10. The capability parameter supportedBandCombination indicates a band combination. The parameter BandCombinationParameters-r10 includes one or a plurality of parameters BandParameters-r10. The parameter BandParameters-r10 indicates one band.

A parameter FreqBandIndicator included in the parameter BandParameters-r10 indicates a frequency of the corresponding band. A parameter bandParametersUL-r10 included in the parameter BandParameters-r10 includes one or a plurality of parameters CA-MIMO-ParametersUL-r10. The parameter CA-MIMO-ParametersUL-r10 includes a parameter ca-BandwidthClassUL-r10, and a parameter supportedMIMO-CapabilityUL-r10. The parameter ca-BandwidthClassUL-r10 indicates a bandwidth class for an uplink in the corresponding band. The parameter supportedMIMO-CapabilityUL-r10 indicates MIMO capability (maximum number of layers supported by the terminal device 1) for the uplink in the corresponding band. That is, the parameter ca-BandwidthClassUL-r10 indicates one combination of a bandwidth class and MIMO capability for the uplink.

A parameter bandParametersDL-r10 included in the parameter BandParameters-r10 includes one or a plurality of parameters CA-MIMO-ParametersDL-r10. The parameter CA-MIMO-ParametersDL-r10 includes a parameter ca-BandwidthClassDL-r10 and a parameter supportedMIMO-CapabilityDL-r10. The parameter ca-BandwidthClassDL-r10 indicates a bandwidth class for a downlink in the corresponding band. The parameter supportedMIMO-CapabilityDL-r10 indicates MIMO capability (maximum number of layers supported by the terminal device 1) for the downlink in the corresponding band. That is, the parameter ca-BandwidthClassDL-r10 indicates one combination of a bandwidth class and MIMO capability for the downlink.

The capability parameter supportedBandCombination may indicate MIMO capability (maximum number of layers supported by the terminal device 1) without carrier aggregation.

For each bandwidth class of each band in each combination of a band, which is specified by the capability parameter supportedBandCombination, the terminal device 1 provides MIMO capability (parameter supportedMIMO-CapabilityDL-v10xx) to the base station apparatus. The MIMO capability (parameter supportedMIMO-CapabilityDL-v10xx) indicates the maximum number of layers supported by the terminal device 1 and is applied to one of downlink component carriers corresponding to a bandwidth class. For each bandwidth class of each band in each combination of a band, which is specified by the capability parameter supportedBandCombination, the parameter supportedMIMO-CapabilityDL-v10xx may be included in the capability information.

That is, for each bandwidth class (parameter ca-BandwidthClassDL-r10) of each band in each combination of a band, which is specified by the capability parameter supportedBandCombination, the terminal device 1 provides MIMO capability (parameter supportedMIMO-CapabilityDL-r10) for a downlink, which is applied to all downlink component carriers corresponding to the bandwidth class, and MIMO capability (parameter supportedMIMO-CapabilityDL-v10xx) applied to each of the downlink component carriers corresponding to the bandwidth class, to the base station apparatus 3. The parameter supportedMIMO-CapabilityDL-v10xx may not be included in the capability parameter supportedBandCombination.

FIG. 15 is a diagram illustrating an example of a combination of the bandwidth class and the MIMO capability in the embodiment. The terminal device 1 may provide four combinations illustrated in FIG. 15 for one band in one combination of a band, which is specified by the capability parameter supportedBandCombination, to the base station apparatus 3. In FIG. 15, in a case where the bandwidth class is B, the parameter supportedMIMO-CapabilityDL-r10 indicates 2, and the parameter supportedMIMO-CapabilityDL-v10xx indicates {4, 2}

In FIG. 15, the base station apparatus 3 which does not enable decryption of the parameter supportedMIMO-CapabilityDL-v10xx determines that the maximum number of layers supported in each of two downlink component carriers (two cells) which are configured in the corresponding band is 2.

In FIG. 15, the base station apparatus 3 which can decrypt the parameter supportedMIMO-CapabilityDL-v10xx determines that the maximum number of layers supported in one of two downlink component carriers (two cells) which are configured in the corresponding band is 4, and the maximum number of layers supported in another of the two downlink component carriers is 2.

In the following descriptions for FIG. 15, it is assumed that two downlink component carriers in one band are configured in the terminal device 1. Here, the base station apparatus 3 may control one of the two downlink component carriers, to which PDSCH (DL-SCH) transmission is applied by using up to four layers. The base station apparatus 3 may transmit a parameter LayersCount-v10xx which is applied only to the first downlink component carrier which is one of the two downlink component carriers, and indicates the maximum number of layers, to the terminal device 1. The base station apparatus 3 may transmit the parameter LayersCount-v10xx which is applied only to the second downlink component carrier which is one of the two downlink component carriers, and indicates the maximum number of layers, to the terminal device 1. The parameter LayersCount-v10xx is a parameter of the RRC layer.

For example, in FIG. 15, the base station apparatus 3 may transmit the parameter LayersCount-v10xx which indicates 4 and is a parameter LayersCount-v10xx for the first downlink component carrier which is one of the two downlink component carriers, and the parameter LayersCount-v10xx which indicates 2, and is a parameter LayersCount-v10xx for the second downlink component carrier which is one of the two downlink component carriers, to the terminal device 1.

For example, in FIG. 15, in a case where the parameter LayersCount-v10xx is received/configured for the first downlink component carrier which is one of the two downlink component carriers, the terminal device 1 may determine that up to four layers indicated by the parameter LayersCount-v10xx are applied to PDSCH (DL-SCH) transmission in the first downlink component carrier which is one of the two downlink component carriers.

For example, in FIG. 15, in a case where the parameter LayersCount-v10xx is not received/configured for the second downlink component carrier which is one of the two downlink component carriers, the terminal device 1 may determine that up to two layers indicated by the parameter supportedMIMO-CapabilityDL-r10 are applied to PDSCH (DL-SCH) transmission in the second downlink component carrier which is one of the two downlink component carriers.

For example, in FIG. 15, in a case where the capability information does not include the parameter supported MIMO-CapabilityDL-r10 and the parameter supported-MIMO-CapabilityDL-v10xx, the terminal device 1 may determine that layers of up to the maximum number of layers corresponding to the capability parameter ue-Category (withoutsuffix) are applied to PDSCH (DL-SCH) transmission in the first downlink component carrier which is one of the two downlink component carriers.

Figure 16:
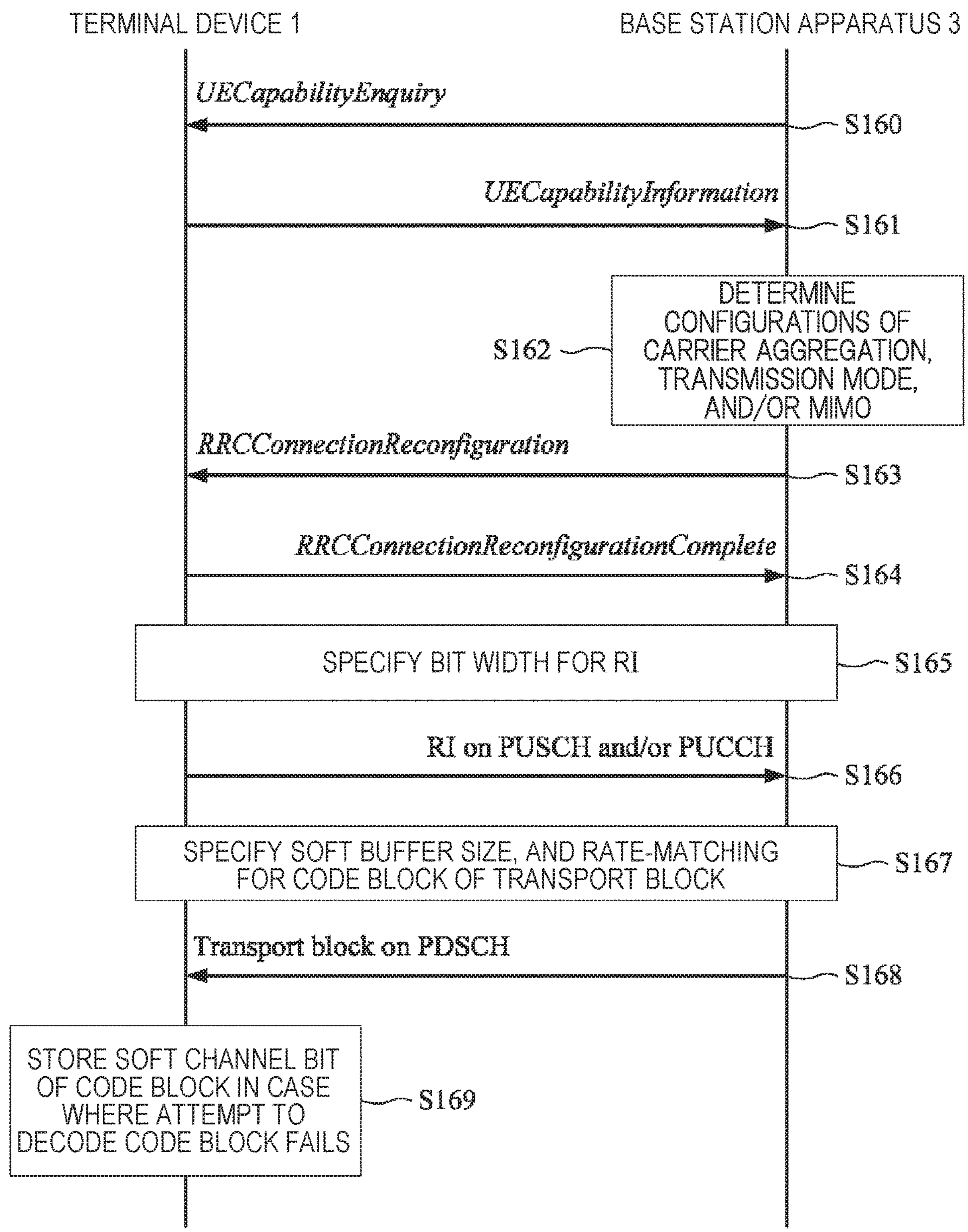
FIG. 16 is a diagram illustrating an example of a sequence chart between the terminal device 1 and the base station apparatus 3 in the embodiment.

FIG. 16 is a diagram illustrating an example of a sequence chart between the terminal device 1 and the base station apparatus 3 in the embodiment.

The base station apparatus 3 transmits an UECapability-Enquiry message to the terminal device 1 (S160). The UECapabilityEnquiry message is a message of the RRC layer. The UECapabilityEnquiry message is used for requiring transmission of the capability information (UECapabilityInformation). In a case where the terminal device 1 receives the UECapabilityEnquiry message, the terminal device 1 transmits the capability information (UECapabilityInformation) to the base station apparatus 3 (S161).

The base station apparatus 3 determines, for the terminal device 1, configurations of carrier aggregation, a transmission mode relating to PDSCH transmission, and/or a MIMO relating to PDSCH transmission, in accordance with the received capability information (UECapabilityInformation) (S162). The base station apparatus 3 transmits an RRCConnectionReconfiguration message to the terminal device 1 (S163). The RRCConnectionReconfiguration message is used for transmitting information of the RRC layer for the configuration determined in S161. The RRCConnectionReconfiguration message is a command for modifying RRC connection. The RRCConnectionReconfiguration message may include the parameter LayersCount-v10xx.

The terminal device 1 modifies/reconfigures the RRC connection, in accordance with the received RRCConnectionReconfiguration message. That is, the terminal device 1 modifies/reconfigures the carrier aggregation, the transmission mode relating to PDSCH transmission, and/or MIMO relating to PDSCH transmission, in accordance with the received RRCConnectionReconfiguration message. The terminal device 1 modifies the RRC connection in accordance with the received RRCConnectionReconfiguration message, and then transmits an RRCConnectionReconfigurationComplete message to the base station apparatus 3. The RRCConnectionReconfigurationComplete message is a message of the RRC layer. The RRCConnectionReconfigurationComplete message is used for confirming successful completion of RRC connection reconfiguration.

The terminal device 1 and the base station apparatus 3 specify the bit width of an RI, based on the configuration which has been determined S162, and/or capability information (UECapabilityInformation) (S165). The terminal device 1 transmits the RI having a bit width which has been determined in S165, to the base station apparatus 3 on a PUCCH or a PUSCH. The base station apparatus 3 assumes the RI having a bit width which has been determined in S165, and thus performs reception processing (multiplexing, separation, demodulation, and/or decoding) of the RI.

The bit width of the RI is determined for each of the corresponding downlink component carrier (cell). A bit width of an RI corresponding to a different downlink component carrier may be different. In a case where the maximum number of layers of a downlink (PDSCH) in the corresponding downlink component carrier is 2, the bit width of the RI is "1". In a case where the maximum number of layers of a downlink (PDSCH) in the corresponding downlink component carrier is 4, the bit width of the RI is "2". In a case where the maximum number of layers of a downlink (PDSCH) in the corresponding downlink component carrier is 8, the bit width of the RI is "3".

The terminal device 1 and the base station apparatus 3 specify a soft buffer size for a code block of a transport block (code word) transmitted on the PDSCH, and rate matching for the code block, based on the configuration which has been determined S162, and/or capability information (UECapabilityInformation) (S167).

The base station apparatus 3 codes the transport block in accordance with the rate matching for the code block of the transport block, which has been specified in S167, and the base station apparatus 3 transmits the coded transport block to the terminal device 1 on the PDSCH (S168). The terminal device 1 performs reception processing (decoding) of the transport block, in accordance with the rate matching for the code block of the transport block, which has been specified in S167.

In a case where an attempt to decoding the code block of the transport block fails, the terminal device 1 stores some or all of soft channel bits of the code block (S169). The amount of the soft channel bits of the code block, which have been stored is determined by referring to the soft buffer size for the code block of the transport block, which has been specified in S167. The stored soft channel bit is used for performing HARQ processing on the code block. The stored soft channel bit may be synthesized with a soft channel bit which has been retransmitted.

A first example of a specifying method of a bit width for an RI in Step S165 in FIG. 16 will be described below. The first example is applied to the terminal device 1.

(1-1) In the first example, the terminal device 1 includes the transmission unit 107 and the reception unit 105. The reception unit 105 receives a PDSCH. The transmission unit 107 transmits a rank indicator (RI) which is determined by the terminal device. The RI corresponds to physical downlink shared channel (PDSCH) transmission in a first downlink component carrier corresponding to a first bandwidth class of a first band in a first band combination. The RI corresponds to the number of useful layers. Here, the transmission unit 107 transmits capability information (UECapabilityInformation) which includes first information (ue-Category (without suffix)), second information (ca-BandwidthClassDL-r10), third information (supportedMIMO-CapabilityDL-r10), and/or fourth information (supportedMIMO-CapabilityDL-v10xx). Here, the reception unit 105 receives fifth information (LayersCount-v10xx) for the first downlink component carrier corresponding to the first bandwidth class of the first band in the first band combination. Here, the first information (ue-Category (without suffix)) indicates a UE category corresponding to the first maximum value of layers supported by the terminal device in a downlink. Here, the second information (ca-BandwidthClassDL-r10) indicates a first bandwidth class which is used for the first band in the first band combination and corresponds to the number of downlink component carrier supported by the terminal device. Here, the third information (supportedMIMO-CapabilityDL-r10) indicates the second maximum value of layers supported by the terminal device in the downlink. The second maximum value of layers is applied to all of one or a plurality of downlink component carriers corresponding to the first bandwidth class of the first band in the first band combination. Here, the fourth information (supportedMIMO-CapabilityDL-v10xx) indicates the third maximum value of layers supported by the terminal device in the downlink. The third maximum value of layers is applied to the any one of one or the plurality of downlink component carriers corresponding to the first bandwidth class of the first band in the first band combination.

Here, the fifth information (LayersCount-v10xx) indicates the fourth maximum value of layers. Here, the fifth maximum value of layers, which is assumed for determining a bit width for an RI is determined based on whether or not the fifth information for the first downlink component carrier corresponding to the first bandwidth class of the first band in the first band combination is configured. The determination is performed with reference to any one of the first maximum value of layers corresponding to the first information, the second maximum value of layers indicated by the third information, and the fourth maximum value of layers indicated by the fifth information. Here, the bit width for the RI is determined with reference to the fifth maximum value of layers.

(1-2) In the first example, in a case where the fifth information (LayersCount-v10xx) for the first downlink component carrier corresponding to the first bandwidth class of the first band in the first band combination is not configured, the fifth maximum value of layers, which is assumed for determining the bit width for the RI is determined with reference to any one of the first maximum value of layers, and the second maximum value of layers. Here, in a case where the fifth information (LayersCount-v10xx) for the first downlink component carrier corresponding to the first bandwidth class of the first band in the first band combination is configured, the fifth maximum value of layers, which is assumed for determining the bit width for the RI is determined with reference to the fourth maximum value of layers.

(1-3) In the first example, in a case where the fifth information (LayersCount-v10xx) for the first downlink component carrier corresponding to the first bandwidth class of the first band in the first band combination is configured, and a first transmission mode (for example, transmission mode 9) relating to the PDSCH transmission for the first downlink component carrier is configured, the fifth maximum value of layers, which is assumed for determining the bit width for the RI is determined in accordance with the minimum of (i) the configured number of first ports, and (ii) the third maximum values of layers. Here, the first port is a transmit antenna port for a channel state information-reference signal (CSI-RS).

(1-4) In the first example, in a case where the fifth information (LayersCount-v10xx) for the first downlink component carrier corresponding to the first bandwidth class of the first band in the first band combination is configured, and a second transmission mode (for example, transmission mode 4) relating to the PDSCH transmission for the first downlink component carrier is configured, the fifth maximum value of layers, which is assumed for determining the bit width for the RI is determined in accordance with the minimum of (i) the number of second ports, and (ii) the third maximum values of layers. Here, the second port is a transmit antenna port for a physical broadcast channel (PBCH). That is, in a case where the fifth information for the first downlink component carrier corresponding to the first bandwidth class of the first band in the first band combination is configured, and the second transmission mode relating to the PDSCH transmission for the first downlink component carrier is configured, the fifth maximum value of layers, which is assumed for determining the bit width for the RI is determined in accordance with at least the third maximum value of layers, which is indicated by the fifth information.

(1-5) In the first example, in a case where the fifth information (LayersCount-v10xx) for the first downlink component carrier corresponding to the first bandwidth class of the first band in the first band combination is not configured, the first transmission mode (for example, transmission mode 9) relating to the PDSCH transmission for the first downlink component carrier is configured, and the capability information (UECapabilityInformation) includes the third information (supportedMIMO-CapabilityDL-r10), the fifth maximum value of layers, which is assumed for determining the bit width for the RI is determined in accordance with the minimum of (i) the configured number of first ports, and (ii) the second maximum values of layers, which are indicated by the third information. Here, the first port is a transmit antenna port for a channel state information-reference signal (CSI-RS).

(1-6) In the first example, in a case where the fifth information (LayersCount-v10xx) for the first downlink component carrier corresponding to the first bandwidth class of the first band in the first band combination is not configured, the first transmission mode (for example, transmission mode 9) relating to the PDSCH transmission for the first downlink component carrier is configured, and the capability information (UECapabilityInformation) does not include the third information (supportedMIMO-CapabilityDL-r10), the fifth maximum value of layers, which is assumed for determining the bit width for the RI is determined in accordance with the minimum of (i) the configured number of first ports, and (ii) the first maximum values of layers, which corresponds to the first information. Here, the first port is a transmit antenna port for a channel state information-reference signal (CSI-RS).

(1-7) In the first example, in a case where the fifth information (LayersCount-v10xx) for the first downlink component carrier corresponding to the first bandwidth class of the first band in the first band combination is not configured, and the second transmission mode (for example, transmission mode 4) relating to the PDSCH transmission for the first downlink component carrier is configured, the fifth maximum value of layers, which is assumed for determining the bit width for the RI is determined in accordance with the minimum of (i) the number of second ports, and (ii) the first maximum values of layers, which corresponds to the first information. Here, the second port is a transmit antenna port for a physical broadcast channel (PBCH).

(1-8) In the first example, the transmission unit 107 transmits the RI on a physical uplink shared channel (PUSCH).

A second example of the specifying method of a bit width for an RI in Step S165 in FIG. 16 will be described below. The second example is applied to the base station apparatus 3.

(2-1) In the second example, the base station apparatus 3 includes the reception unit 305 and the transmission unit 307. The transmission unit 307 transmits a PDSCH to the terminal device. The reception unit 305 receives the rank indicator (RI) which is determined by the terminal device, from the terminal device. The RI corresponds to physical downlink shared channel (PDSCH) transmission in a first downlink component carrier corresponding to a first bandwidth class of a first band in a first band combination. The RI corresponds to the number of useful layers. Here, the reception unit 305 receives capability information (UECapabilityInformation) which includes first information (ue- Category (without suffix)), second information (ca-BandwidthClassDL-r10), third information (supportedMIMO-CapabilityDL-r10), and/or fourth information (supportedMIMO-CapabilityDL-v10xx), from the terminal device. Here, the transmission unit 307 transmits fifth information (LayersCount-v10xx) for the first downlink component carrier corresponding to the first bandwidth class of the first band in the first band combination, to the terminal device. Here, the first information (ue-Category (without-suffix)) indicates a UE category corresponding to the first maximum value of layers supported by the terminal device in a downlink. Here, the second information (ca-BandwidthClassDL-r10) indicates a first bandwidth class which is used for the first band in the first band combination and corresponds to the number of downlink component carrier supported by the terminal device. Here, the third information (supportedMIMO-CapabilityDL-r10) indicates the second maximum value of layers supported by the terminal device in the downlink. The second maximum value of layers is applied to all of one or a plurality of downlink component carriers corresponding to the first bandwidth class of the first band in the first band combination. Here, the fourth information (supportedMIMO-CapabilityDL-v10xx) indicates the third maximum value of layers supported by the terminal device in the downlink. The third maximum value of layers is applied to the any one of one or the plurality of downlink component carriers corresponding to the first bandwidth class of the first band in the first band combination. Here, the fifth information (LayersCount-v10xx) indicates the fourth maximum value of layers. The fifth maximum value of layers, which is assumed for determining the bit width for the RI is determined based on whether or not the fifth information (LayersCount-v10xx) for the first downlink component carrier corresponding to the first bandwidth class of the first band in the first band combination is configured for the terminal device. The determination is performed with reference to any one of the first maximum value of layers corresponding to the first information, the second maximum value of layers indicated by the third information, and the fourth maximum value of layers indicated by the fifth information.

(2-2) In the second example, in a case where the fifth information (LayersCount-v10xx) for the first downlink component carrier corresponding to the first bandwidth class of the first band in the first band combination is not configured for the terminal device, the fifth maximum value of layers, which is assumed for determining the bit width for the RI is determined with reference to any one of the first maximum value of layers, and the second maximum value of layers. Here, in a case where the fifth information (LayersCount-v10xx) for the first downlink component carrier corresponding to the first bandwidth class of the first band in the first band combination is configured for the terminal device, the fifth maximum value of layers, which is assumed for determining the bit width for the RI is determined with reference to the fourth maximum value of layers.

(2-3) In the second example, in a case where the fifth information (LayersCount-v10xx) for the first downlink component carrier corresponding to the first bandwidth class of the first band in the first band combination is configured for the terminal device, and a first transmission mode (for example, transmission mode 9) relating to the PDSCH transmission for the first downlink component carrier is configured for the terminal device, the fifth maximum value of layers, which is assumed for determining the bit width for the RI is determined in accordance with the minimum of (i) the configured number of first ports, and (ii) the third maximum values of layers. Here, the first port is a transmit antenna port for a channel state information-reference signal (CSI-RS).

(2-4) In the second example, in a case where the fifth information (LayersCount-v10xx) for the first downlink component carrier corresponding to the first bandwidth class of the first band in the first band combination is configured for the terminal device, and a second transmission mode (for example, transmission mode 4) relating to the PDSCH transmission for the first downlink component carrier is configured, the fifth maximum value of layers, which is assumed for determining the bit width for the RI is determined in accordance with the minimum of (i) the number of second ports, and (ii) the third maximum values of layers. Here, the second port is a transmit antenna port for a physical broadcast channel (PBCH). That is, in a case where the fifth information for the first downlink component carrier corresponding to the first bandwidth class of the first band in the first band combination is configured, and the second transmission mode relating to the PDSCH transmission for the first downlink component carrier is configured, the fifth maximum value of layers, which is assumed for determining the bit width for the RI is determined in accordance with at least the third maximum value of layers, which is indicated by the fifth information.

(2-5) In the second example, in a case where the fifth information (LayersCount-v10xx) for the first downlink component carrier corresponding to the first bandwidth class of the first band in the first band combination is not configured for the terminal device, the first transmission mode (for example, transmission mode 9) relating to the PDSCH transmission for the first downlink component carrier is configured for the terminal device, and the capability information (UECapabilityInformation) includes the third information (supportedMIMO-CapabilityDL-r10), the fifth maximum value of layers, which is assumed for determining the bit width for the RI is determined in accordance with the minimum of (i) the configured number of first ports, and (ii) the second maximum values of layers, which is indicated by the third information. Here, the first port is a transmit antenna port for a channel state information-reference signal (CSI-RS).

(2-6) In the second example, in a case where the fifth information (LayersCount-v10xx) for the first downlink component carrier corresponding to the first bandwidth class of the first band in the first band combination is not configured for the terminal device, the first transmission mode (for example, transmission mode 9) relating to the PDSCH transmission for the first downlink component carrier is configured for the terminal device, and the capability information (UECapabilityInformation) does not include the third information (supportedMIMO-CapabilityDL-r10), the fifth maximum value of layers, which is assumed for determining the bit width for the RI is determined in accordance with the minimum of (i) the configured number of first ports, and (ii) the first maximum values of layers, which corresponds to the first information. Here, the first port is a transmit antenna port for a channel state information-reference signal (CSI-RS).

(2-7) In the second example, in a case where the fifth information (LayersCount-v10xx) for the first downlink component carrier corresponding to the first bandwidth class of the first band in the first band combination is not configured for the terminal device, and the second transmission mode (for example, transmission mode 4) relating to the PDSCH transmission for the first downlink component carrier is configured for the terminal device, the fifth maximum value of layers, which is assumed for determining the bit width for the RI is determined in accordance with the minimum of (i) the number of second ports, and (ii) the first maximum values of layers, which corresponds to the first information. Here, the second port is a transmit antenna port for a physical broadcast channel (PBCH).

(2-8) In the second example, the reception unit 305 transmits the RI on a physical uplink shared channel (PUSCH).

A third example of the specifying method of a bit width for an RI in Step S165 in FIG. 16 will be described below. The third example is applied to the terminal device 1. In the third example, the capability information (UECapabilityInformation) includes the third information (supportedMIMO-CapabilityDL-r10). In the third example, the capability information (UECapabilityInformation) may not include the fourth information (supportedMIMO-CapabilityDL-v10xx).

(3-1) In the third example, the terminal device 1 includes the transmission unit 107 and the reception unit 105. The reception unit 105 receives a PDSCH. The transmission unit 107 transmits a rank indicator (RI) determined by the terminal device. The RI corresponds to physical downlink shared channel (PDSCH) transmission in a downlink component carrier corresponding to a first band in a first band combination. The RI corresponds to the number of layers. Here, the first maximum value of layers, which is assumed for determining the bit width for the RI is determined based on the number of downlink component carriers configured in the first band in the first band combination.

(3-2) In the third example, the first band combination includes only the first band.

(3-3) In the third example, in the terminal device, the transmission mode 9 or 10 relating to the PDSCH transmission is configured.

(3-4) In the third example, the transmission unit 107 transmits capability information (UECapabilityInformation) which includes first information (ca-BandwidthClassDL-r10), second information (supportedMIMO-CapabilityDL-r10), third information (ca-BandwidthClassDL-r10), and fourth information (supportedMIMO-CapabilityDL-r10). Here, the first information (ca-BandwidthClassDL-r10) indicates a first bandwidth class which is the first bandwidth class of the first band in the first band combination and indicates the first number of downlink component carriers supported by the terminal device. Here, the second information (supportedMIMO-CapabilityDL-r10) indicates the first maximum value of layers supported by the terminal device in a downlink. The first maximum value of layers is applied to all of downlink component carriers of the first number, which correspond to the first bandwidth class of the first band in the first band combination. Here, the third information (ca-BandwidthClassDL-r10) indicates a second bandwidth class which is the second bandwidth class of the first band in the first band combination, and indicates the second bandwidth class which indicates the second number of downlink component carriers supported by the terminal device. Here, the fourth information (supportedMIMO-CapabilityDL-r10) indicates the second maximum value of layers supported by the terminal device in the downlink. The second maximum value of layers is applied to all of downlink component carriers of the second number, which correspond to the second bandwidth class of the first band in the first band combination. Here, the third maximum value of layers, which is assumed for determining the bit width for the RI is determined based on which one of the first number and the second number is the number of downlink component carriers configured in the first band in the first band combination. The determination is performed with reference to one of the first maximum value of layers and the second maximum value of layers.

(3-5) In the third example, the transmission unit 107 transmits the RI on a physical uplink shared channel (PUSCH).

(3-6) In the third example, in a case where the number of downlink component carriers configured in the first band in the first band combination is the first number, the third maximum value of layers, which is assumed for determining the bit width for the RI is the first maximum value of layers. Here, in a case where the number of downlink component carriers configured in the first band in the first band combination is the second number, the third maximum value of layers, which is assumed for determining the bit width for the RI is the second maximum value of layers.

A fourth example of the specifying method of a bit width for an RI in Step S165 in FIG. 16 will be described below. The fourth example is applied to the base station apparatus 3. In the fourth example, the capability information (UECapabilityInformation) includes the third information (supportedMIMO-CapabilityDL-r10). In the fourth example, the capability information (UECapabilityInformation) may not include the fourth information (supportedMIMO-CapabilityDL-v10xx).

(4-1) In the fourth example, the base station apparatus 3 includes the reception unit 305 and the transmission unit 307. The transmission unit 307 transmits a PDSCH to the terminal device. The reception unit 305 receives a rank indicator (RI) from the terminal device. The RI corresponds to the physical downlink shared channel (PDSCH) transmission in a downlink component carrier corresponding to the first band in the first band combination, and corresponds to the number of layers. The RI is determined by the terminal device. Here, the first maximum value of layers, which is assumed for determining the bit width for the RI is determined based on the number of downlink component carriers configured in the first band in the first band combination.

(4-2) In the fourth example, the first band combination includes only the first band.

(4-3) In the fourth example, in the terminal device, the transmission mode 9 or 10 relating to the PDSCH transmission is configured.

(4-4) In the fourth example, the reception unit 305 receives capability information (UECapabilityInformation) from the terminal device. The capability information (UECapabilityInformation) includes first information (ca-BandwidthClassDL-r10), second information (supportedMIMO-CapabilityDL-r10), third information (ca-BandwidthClassDL-r10), and fourth information (supportedMIMO-CapabilityDL-r10). Here, the first information (ca-BandwidthClassDL-r10) indicates a first bandwidth class which is the first bandwidth class of the first band in the first band combination and indicates the first number of downlink component carriers supported by the terminal device. Here, the second information (supportedMIMO-CapabilityDL-r10) indicates the first maximum value of layers supported by the terminal device in a downlink. The first maximum value of layers is applied to all of downlink component carriers of the first number, which correspond to the first bandwidth class of the first band in the first band combination. Here, the third information (ca-BandwidthClassDL-r10) indicates a second bandwidth class which is the second bandwidth class of the first band in the first band combination, and indicates the second bandwidth class which indicates the second number of downlink component carriers supported by the terminal device. Here, the fourth information (supportedMIMO-CapabilityDL-r10) indicates the second maximum value of layers supported by the terminal device in the downlink. The second maximum value of layers is applied to all of downlink component carriers of the second number, which correspond to the second bandwidth class of the first band in the first band combination. Here, the third maximum value of layers, which is assumed for determining the bit width for the RI is determined based on which one of the first number and the second number is the number of downlink component carriers configured in the first band in the first band combination. The determination is performed with reference to one of the first maximum value of layers and the second maximum value of layers.

(4-5) In the fourth example, the reception unit 305 receives the RI on a physical uplink shared channel (PUSCH).

(4-6) In the fourth example, in a case where the number of downlink component carriers configured in the first band in the first band combination is the first number, the third maximum value of layers, which is assumed for determining the bit width for the RI is the first maximum value of layers. Here, in a case where the number of downlink component carriers configured in the first band in the first band combination is the second number, the third maximum value of layers, which is assumed for determining the bit width for the RI is the second maximum value of layers.

An example of a specifying method of rate matching for a code block of a transport block in Step S167 in FIG. 16 will be described below.

Figure 17:
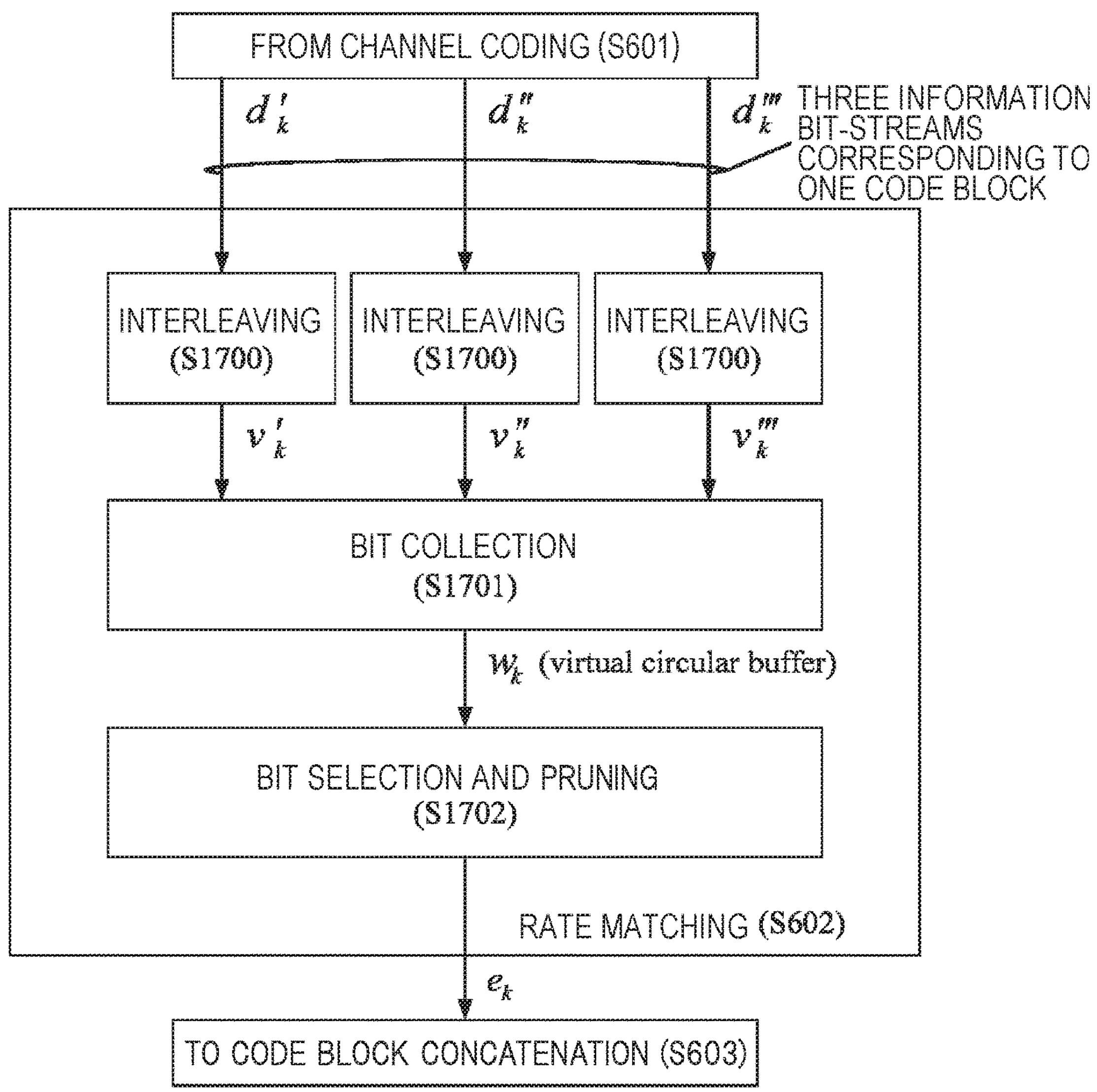
FIG. 17 is a diagram illustrating an example of rate matching in the embodiment.

FIG. 17 is a diagram illustrating an example of rate matching in the embodiment. The rate matching is performed in S602 of FIG. 6. That is, the rate matching is applied to a code block of a transport block.

One rate matching (S602) includes three interleavings (S1700), one bit collection (S1701), and one bit selection and pruning (S2002). Three information bit-streams ($d'_k$, $d''_k$, and $d'''_k$) are input to the one rate matching (S602) from channel coding (S601). Each of the three information bit-streams ($d'_k$, $d''_k$, and $d'''_k$) is interleaved in accordance with sub-block interleaver in the interleaving (S1700). Interleaving each of the three information bit-streams ($d'_k$, $d''_k$, and $d'''_k$) causes three output sequences ($v'_k$, $v''_k$, and $v'''_k$) to be obtained.

The number $C_{subblock}$ of columns of a subframe interleaver is 32. The number $R_{subblock}$ of rows of the sub-block interleaver is the smallest integer which satisfies the following inequality (1). Here, D is the number of bits of each of the information bit-streams ($d'_k$, $d''_k$, and $d'''_k$).

$$D \le (R_{subblock} \times C_{subblock}) \quad \text{[Expression 1]}$$

The number $K_\Pi$ of bits of each of the output sequences ($v'_k$, $v''_k$, and $v'''_k$) of the subframe interleaver is determined by the following expression (2).

$$K_\Pi = (R_{subblock} \times C_{subblock}) \quad \text{[Expression 2]}$$

In the bit collection (S2001), $w_k$ (virtual circular buffer) is obtained from the three output sequences ($v'_k$, $v''_k$, and $v'''_k$). $w_k$ is determined by the following expression (3). The number Kw of bits of $w_k$ is triple $K_\Pi$.

$$w_k = v'_k \text{ for } k=0, \ldots, K_\Pi - 1$$

$$w_{K_\Pi + 2k} = v''_k \text{ for } k=0, \ldots, K_\Pi - 1$$

$$w_{K_\Pi 2k+1} = v'''_k \text{ for } k=0, \ldots, K_{529} - 1 \quad \text{[Expression 3]}$$

In the bit selection and pruning (S1702) in FIG. 17, a rate matching output bit sequence $e_k$ is obtained from $w_k$. The number of bits of the rate matching output bit sequence $e_k$ is E. FIG. 18 is a diagram illustrating an example of the bit selection and pruning in the embodiment. $rv_{idx}$ in FIG. 18 is a redundancy version (RV) number for transmission of the corresponding transport block. The RV number is indicated by information which is included in the DCI format. $N_{cb}$ in FIG. 18 is a soft buffer size for the corresponding code block, and is expressed by the number of bits. $N_{cb}$ is determined by the following expression (4).

$$N_{cb} = \min\left(\left\lfloor \frac{N_{IR}}{C} \right\rfloor, K_w\right) \quad \text{[Expression 4]}$$

Here, C is the number of code blocks obtained by dividing one transport block in code block segmentation (S600) of FIG. 6. Here, $N_{IR}$ is a soft buffer size for the corresponding transport block, and is expressed by the number of bits. $N_{IR}$ is determined by the following expression (5).

$$N_{IR} = \left\lfloor \frac{N_{soft}}{K_C \cdot K_{MIMO} \cdot \min(M_{DL\_HARQ}, M_{limit})} \right\rfloor \quad \text{[Expression 5]}$$

Here, in a case where the terminal device 1 is configured so as to receive PDSCH transmission, based on the transmission mode 3, 4, 8, 9, or 10, $K_{MIMO}$ is 2. In other cases, $K_{MIMO}$ is 1. $K_{MIMO}$ is the same as the maximum number of transport blocks allowed to be included in one PDSCH transmission which is received based on the transmission mode which is configured in the terminal device 1.

Here, $M_{DL\_HARQ}$ is the maximum number of downlink HARQ processes which are managed in parallel with each other in the one corresponding serving cell. For an FDD serving cell, $M_{DL\_HARQ}$ may be 8. For a TDD serving cell, $M_{DL\_HARQ}$ may correspond to an uplink-downlink configuration. Here, $M_{limit}$ is 8.

Here, $K_c$ is any one of 1, 3/2, 2, 3, and 5. A configuring method of $K_c$ will be described after a configuring method of $N_{soft}$.

Here, $N_{soft}$ is the total number of soft channel bits corresponding to an UE category or a downlink UE category. $N_{soft}$ is determined based on any one of the capability parameter ue-Category (without suffix), the capability parameter ue-Category-v1020, the capability parameter ue-Category-v1170, and the capability parameter ue-CategoryDL-r12.

$N_{soft}$ may be specified based on (i) a parameter which is transmitted among the capability parameter ue-Category (without suffix), the capability parameter ue-Category-v1020, the capability parameter ue-Category-v1170, and the capability parameter ue-CategoryDL-r12, ii) whether or not the parameter LayersCount-v10xx is received/configured, and/or (iii) whether or not a parameter altCQI-Table-r12 is received/configured.

In a case where the parameter altCQI-Table-r12 is not configured in the terminal device 1, the terminal device 1 derives a CQI based on a first table which indicates a correspondence between a combination of a modulation scheme and a coding rate, and the CQI for a single transport block transmitted on a PDSCH. In a case where the parameter altCQI-Table-r12 is configured in the terminal device 1, the terminal device 1 derives the CQI based on a second table which indicates a correspondence between the combination of a modulation scheme and a coding rate, and the CQI for a single transport block transmitted on a PDSCH.

The first table may be a table designed on the assumption that 256QAM is not applied to a PDSCH. The second table may be a table designed on the assumption that 256QAM is applied to a PDSCH.

Figure 19:
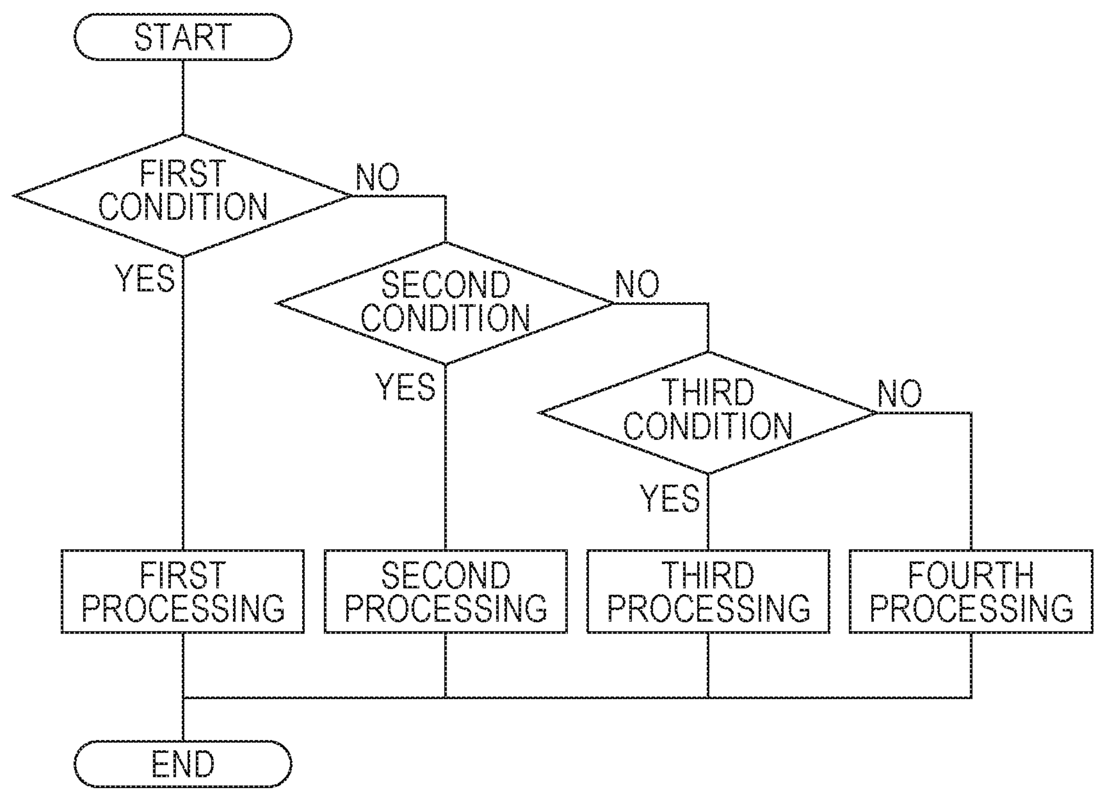
FIG. 19 is a diagram illustrating an example of a flowchart relating to determination of the total number $N_{soft}$ of soft channel bits in the embodiment.

FIG. 19 is a diagram illustrating an example of a flowchart relating to determination of the total number $N_{soft}$ of soft channel bits in the embodiment. The flow in FIG. 19 may be applied to each downlink component carrier (cell). In a case where a first condition is satisfied, first processing is performed. In a case where the first condition is not satisfied, the process proceeds to a second condition. In a case where the second condition is satisfied, second processing is performed. In a case where the second condition is not satisfied, the process proceeds to a third condition. In a case where the third condition is satisfied, third processing is performed. In a case where the third condition is not satisfied, fourth processing is performed. After the first processing, the second processing, the third processing, or the fourth processing, the flow relating to the determination of the total number $N_{soft}$ of soft channel bits is ended.

In the first condition of FIG. 19, (i) if the terminal device 1 performs signaling of the capability parameter ue-CategoryDL-r12 which indicates the downlink UE category 0 or (ii) if the terminal device 1 performs signaling of the capability parameter ue-CategoryDL-r12 which does not indicate the downlink UE category 0, and the parameter altCQI-Table-r12 is configured for the downlink component carrier (cell) in the terminal device 1 by a higher layer (YES), $N_{soft}$ is the total number of soft channel bits corresponding to the downlink UE category which is indicated by the capability parameter ue-CategoryDL-r12 (first processing).

In the second condition of FIG. 19, if the terminal device 1 performs signaling of the capability parameter ue-Category-v11a0, and the parameter altCQI-Table-r12 is configured for the downlink component carrier (cell) in the terminal device 1 by a higher layer (YES), $N_{soft}$ is the total number of soft channel bits corresponding to an UE category which is indicated by the capability parameter ue-Category-v11a0 (second processing).

In the third condition of FIG. 19, if the terminal device 1 performs signaling of the capability parameter ue-Category-v1020, and the first transmission mode (for example, transmission mode 9 or transmission mode 10) is configured for the downlink component carrier (cell) in the terminal device 1 (YES), $N_{soft}$ is the total number of soft channel bits corresponding to an UE category which is indicated by the capability parameter ue-Category-v1020 (third processing). Here, the terminal device 1 may or may not perform signaling of the capability parameter ue-Category-v1170.

In the third condition of FIG. 19, if the terminal device 1 performs signaling of the capability parameter ue-Category-v1020, and the parameter LayersCount-v10xx is configured for the downlink component carrier (cell) in the terminal device 1 by the higher layer (YES), $N_{soft}$ is the total number of soft channel bits corresponding to an UE category which is indicated by the capability parameter ue-Category-v1020 (first processing). Here, a transmission mode other than the first transmission mode may be configured in the terminal device 1. Here, the terminal device 1 may or may not perform signaling of the capability parameter ue-Category-v1170.

In a case where the first condition, the second condition, and the third condition in FIG. 19 are not satisfied, $N_{soft}$ is the total number of soft channel bits corresponding to an UE category which is indicated by the capability parameter ue-Category (without suffix) (fourth processing). For example, if the terminal device 1 performs signaling of the capability parameter ue-Category-v11a0, the capability parameter ue-Category-v1120, the capability parameter ue-Category-v1020, and the capability parameter ue-Category (without suffix), the parameter altCQI-Table-r12 is not configured for the downlink component carrier (cell) in the terminal device 1 by a higher layer, the parameter LayersCount-v10xx is not configured for the downlink component carrier (cell) in the terminal device 1 by the higher layer, and a transmission mode other than the first transmission mode is configured in the terminal device 1, $N_{soft}$ is the total number of soft channel bits corresponding to an UE category which is indicated by the capability parameter ue-Category (without suffix). For example, if the terminal device 1 performs signaling of the capability parameter ue-Category-v1120, the capability parameter ue-Category-v1020, and the capability parameter ue-Category (without suffix), the parameter LayersCount-v10xx is not configured for the downlink component carrier (cell) in the terminal device 1 by the higher layer, and a transmission mode other than the first transmission mode is configured in the terminal device 1, $N_{soft}$ is the total number of soft channel bits corresponding to an UE category which is indicated by the capability parameter ue-Category (without suffix).

FIG. 20 is a diagram illustrating an example of a configuring method of $K_c$ in the embodiment. $K_c$ is determined based on (i) $N_{soft}$ specified in FIG. 19, (ii) whether or not the parameter altCQI-Table-r12 is configured for the downlink component carrier (cell) in the terminal device 1 by the higher layer, and/or (iii) the maximum number of layers for the downlink component carrier (cell). Here, the maximum number of layers may be determined with reference to (i) the number of layers supported by a PDSCH transmission scheme corresponding to a transmission mode which is configured in the terminal device 1, for the downlink component carrier (cell), and/or (ii) the maximum number of layers assumed for specifying a bit width for an RI in S165 of FIG. 16. For example, the maximum number of layers may be determined in accordance with the small one of the number of layers supported by a PDSCH transmission scheme corresponding to the transmission mode which is configured in the terminal device 1, for (i) the downlink component carrier (cell), and (ii) the maximum number of layers assumed for specifying a bit width for an RI in S165 of FIG. 16.

That is, the soft buffer size $N_{cb}$ for the corresponding code block and rate matching for the corresponding code block may be determined with reference to some or all of the followings (i) to (v): (i) a capability parameter which is transmitted among the capability parameter ue-Category (without suffix), the capability parameter ue-Category-v1020, the capability parameter ue-Category-v1170, and the capability parameter ue-CategoryDL-r12; (ii) whether or not the parameter LayersCount-v10xx is received/configured for the downlink component carrier; (iii) whether or not the parameter altCQI-Tabler12 is received/configured for the downlink component carrier; (iv) the number of layers supported by a PDSCH transmission scheme corresponding to a transmission mode which is configured in the terminal device 1 for the downlink component carrier; and (v) the maximum number of layers assumed for specifying a bit width for an RI.

A fifth example relating to a specifying method of rate matching for a code block size of a transport block in Step S167 of FIG. 16 will be described below. The fifth example is applied to the terminal device 1.

(5-1) In the fifth example, the terminal device 1 includes the transmission unit 107, the reception unit 105, and the decoding portion 1051. The transmission unit 107 transmits a rank indicator (RI) for physical downlink shared channel (PDSCH) transmission. The reception unit 105 receives first information (RRCConnectionReconfiguration message) used for determining a first maximum value of layers which is assumed for determining a bit width of the RI, and receives a transport block on the PDSCH. The decoding portion 1051 decodes the code block of the transport block. Here, rate matching for the code block is performed based on at least a soft buffer size for the code block. Here, the soft buffer size for the code block is determined based on at least the first information (RRCConnectionReconfiguration message) which is used for determining the first maximum value of layers.

(5-2) In the fifth example, the transmission unit 107 transmits the RI on a physical uplink shared channel (PUSCH).

(5-3) In the fifth example, a certain transmission mode relating to the PDSCH transmission is configured in the terminal device 1.

(5-4) In the fifth example, the transmission unit 107 transmits capability information (UECapabilityInformation) which includes second information (ue-Category (without suffix)) and third information (ue-Category-v1020). Here, the second information (ue-Category (without suffix)) indicates a first UE category corresponding to the second maximum value of layers supported by the terminal device in a downlink and corresponding to a first total number of soft channel bits which are available for hybrid automatic repeat request (HARQ) processing in the downlink. Here, the third information (ue-Category-v1020) indicates a second UE category corresponding to the third maximum value of layers supported by the terminal device in the downlink and corresponding to a second total number of soft channel bits which are available for hybrid automatic repeat request (HARQ) processing in the downlink. Here, the soft buffer size for the code block is determined based on whether or not the first information (RRCConnectionReconfiguration message) used for determining the first maximum value of layers indicates the fourth maximum value of layers. The determination is performed with reference to one of the first total number and the second total number. That is, the soft buffer size for the code block is determined based on whether or not the first information used for determining the first maximum value of layers is configured to a value indicating the fourth maximum value of layers. The determination is performed with reference to one of the first total number and the second total number.

(5-5) In the fifth example, in a case where the first information (RRCConnectionReconfiguration message) used for determining the first maximum value of layers indicates the fourth maximum value of layers, the soft buffer size for the code block is determined with reference to the first total number. Here, in a case where the first information (RRCConnectionReconfiguration message) used for determining the first maximum value of layers does not indicate the fourth maximum value of layers, the soft buffer size for the code block is determined with reference to the second total number. Here, a case where "the first information (RRCConnectionReconfiguration message) does not indicate the fourth maximum value of layers" includes a case where "the first information (RRCConnectionReconfiguration message) does not include the parameter LayersCount-v10xx". That is, in a case where the first information used for determining the first maximum value of layers is configured so as to have a value indicating the fourth maximum value of layers, the soft buffer size for the code block is determined with reference to the first total number. In a case where the first information used for determining the first maximum value of layers is not configured so as to have a value indicating the fourth maximum value of layers, the soft buffer size for the code block is determined with reference to the second total number.

(5-6) In the fifth example, in a case where the first information (RRCConnectionReconfiguration message) used for determining the first maximum value of layers indicates the fourth maximum value of layers, the first maximum value of layers is determined with reference to the fourth maximum value of layers. Here, a case where "the first information (RRCConnectionReconfiguration message) indicates the fourth maximum value of layers" includes a case where "the parameter LayersCount-v10xx included in the first information (RRCConnectionReconfiguration message) indicates the fourth maximum value of layers". That is, in a case where the first information is received, the first maximum value of layers is determined with reference to the first information.

(5-7) In the fifth example, in a case where the first information (RRCConnectionReconfiguration message) used for determining the first maximum value of layers does not indicate the fourth maximum value of layers, the first maximum value of layers is determined with reference to any one of a plurality of maximum numbers of layers, which includes the second maximum value of layers, and the third maximum value of layers. That is, in a case where the first information is not received, the first maximum value of layers is determined with reference to one of the second information and the third information.

A sixth example relating to the specifying method of rate matching for a code block size of a transport block in Step S167 of FIG. 16 will be described below. The sixth example is applied to the base station apparatus 3.

(6-1) In the sixth example, the base station apparatus 3 includes the reception unit 305, the transmission unit 307, and the coding portion 3071. The reception unit 305 receives a rank indicator (RI) for physical downlink shared channel (PDSCH) transmission, from the terminal device. The transmission unit 307 transmits first information (RRCConnectionReconfiguration message) to the terminal device, and transmits the transport block to the terminal device on the PDSCH. The first information (RRCConnectionReconfiguration message) is used for determining the first maximum value of layers, by the terminal device. The first maximum value of layers is assumed for determining a bit width for the RI, by the terminal device. The coding portion 3071 codes the code block of the transport block. Here, rate matching for the coded code block is performed based on a soft buffer size for the code block. Here, the soft buffer size for the code block is determined based on at least the first information (RRCConnectionReconfiguration message) which is used for determining the first maximum value of layers, by the terminal device.

(6-2) In the sixth example, the reception unit 305 receives the RI from the terminal device on a physical uplink shared channel (PUSCH).

(6-3) In the sixth example, a certain transmission mode relating to the PDSCH transmission is configured in the terminal device 1.

(6-4) In the sixth example, the reception unit 305 includes capability information (UECapabilityInformation) which includes second information (ue-Category (without suffix)) and third information (ue-Category-v1020), from the terminal device. Here, the second information (ue-Category (without suffix)) indicates a first UE category corresponding to the second maximum value of layers supported by the terminal device in a downlink and corresponding to a first total number of soft channel bits which are available for hybrid automatic repeat request (HARQ) processing in the downlink. Here, the third information (ue-Category-v1020) indicates a second UE category corresponding to the third maximum value of layers supported by the terminal device in the downlink and corresponding to a second total number of soft channel bits which are available for hybrid automatic repeat request (HARQ) processing in the downlink. Here, the soft buffer size for the code block is determined based on whether or not the first information (RRCConnectionReconfiguration message) which is used by the terminal device for determining the first maximum value of layers indicates the fourth maximum value of layers. The determination is performed with reference to one of the first total number and the second total number. That is, the soft buffer size for the code block is determined based on whether or not the first information used for determining the first maximum value of layers is configured to a value indicating the fourth maximum value of layers. The determination is performed with reference to one of the first total number and the second total number.

(6-5) In the sixth example, in a case where the first information (RRCConnectionReconfiguration message) which is used for determining the first maximum value of layers by the terminal device indicates the fourth maximum value of layers, the soft buffer size for the code block is determined with reference to the first total number. Here, in a case where the first information (RRCConnectionReconfiguration message) which is used for determining the first maximum value of layers by the terminal device does not indicate the fourth maximum value of layers, the soft buffer size for the code block is determined with reference to the second total number. Here, a case where "the first information (RRCConnectionReconfiguration message) does not indicate the fourth maximum value of layers" includes a case where "the first information (RRCConnectionReconfiguration message) does not include the parameter LayersCount-v10xx". That is, in a case where the first information used for determining the first maximum value of layers is configured so as to have a value indicating the fourth maximum value of layers, the soft buffer size for the code block is determined with reference to the first total number. In a case where the first information used for determining the first maximum value of layers is not configured so as to have a value indicating the fourth maximum value of layers, the soft buffer size for the code block is determined with reference to the second total number.

(6-6) In the sixth example, in a case where the first information (RRCConnectionReconfiguration message) which is used for determining the first maximum value of layers by the terminal device indicates the fourth maximum value of layers, the first maximum value of layers is determined with reference to the fourth maximum value of layers. Here, a case where "the first information (RRCConnection-Reconfiguration message) indicates the fourth maximum value of layers" includes a case where "the parameter LayersCount-v10xx included in the first information (RRC-ConnectionReconfiguration message) indicates the fourth maximum value of layers". That is, in a case where the first information is received, the first maximum value of layers is determined with reference to the first information.

(6-7) In the sixth example, in a case where the first information (RRCConnectionReconfiguration message) which is used for determining the first maximum value of layers by the terminal device does not indicate the fourth maximum value of layers, the first maximum value of layers is determined with reference to any one of a plurality of maximum numbers of layers, which includes the second maximum value of layers, and the third maximum value of layers. That is, in a case where the first information is not received, the first maximum value of layers is determined with reference to one of the second information and the third information.

In S169 of FIG. 16, the soft channel bits of the code block of the transport block, which are stored by the terminal device 1 are determined based on the soft buffer size $N_{cb}$ for the code block of the transport block. In a case where an attempt of the terminal device 1 to decode the code block of the transport block fails, the terminal device 1 stores at least soft channel bits which have been received corresponding to a range of $<w_k, w_{k+1}, \ldots, w_{(k+nSB-1) mod\ Ncb}>$. k of $<w_k, w_{k+1}, \ldots, w_{(k+nSB-1) mod\ Ncb}>$ is determined by the terminal device 1. Here, it is preferable that the terminal device 1 preferentially stores soft channel bits corresponding to a value which is lower than k, when k of $<w_k, w_{k+1}, \ldots, w_{(k+nSB-1) mod\ Ncb}>$ is determined.

Figure 21:
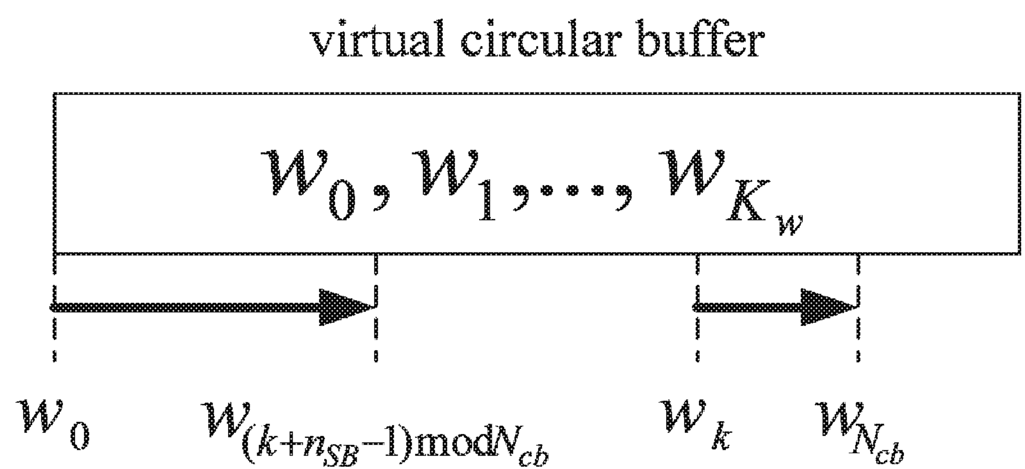
FIG. 21 is a diagram illustrating an example of a range of $<w_k, w_{k+1}, \ldots, w_{(k+nSB-1) mod\ Ncb}>$ in the embodiment.

FIG. 21 is a diagram illustrating an example of a range of $<w_k, w_{k+1}, \ldots, w_{(k+nSB-1) mod\ Ncb}>$ in the embodiment. Here, $n_{SB}$ is determined with reference to the soft buffer size $N_{cb}$ for the code block of the transport block. $n_{sB}$ is determined by the following expression (6).

[Expression 6]

$$n_{SB} = \min\left(N_{cb}, \left\lfloor \frac{N'_{soft}}{C \cdot N_{DL\_cells} \cdot K_{MIMO} \cdot \min(M_{DL\_HARQ}, M_{limit})} \right\rfloor\right)$$

Here, C is defined in the expression (4). Here, $K_{MIMO}$, $M_{DL\_HARQ}$, and $M_{limit}$ are defined in the expression (5). Here, $N_{DL\_cells}$ is the number of downlink component carriers (cells) which are configured for the terminal device 1. Here, $N'_{soft}$ is the total number of soft channel bits corresponding to an UE category or a downlink UE category. $N'_{soft}$ is determined based on any one of the capability parameter ue-Category (without suffix), the capability parameter ue-Category-v1020, the capability parameter ue-Category-v1170, and the capability parameter ue-CategoryDL-r12. $N_{soft}$ and $N_{soft}$ are separately defined.

Figure 22:
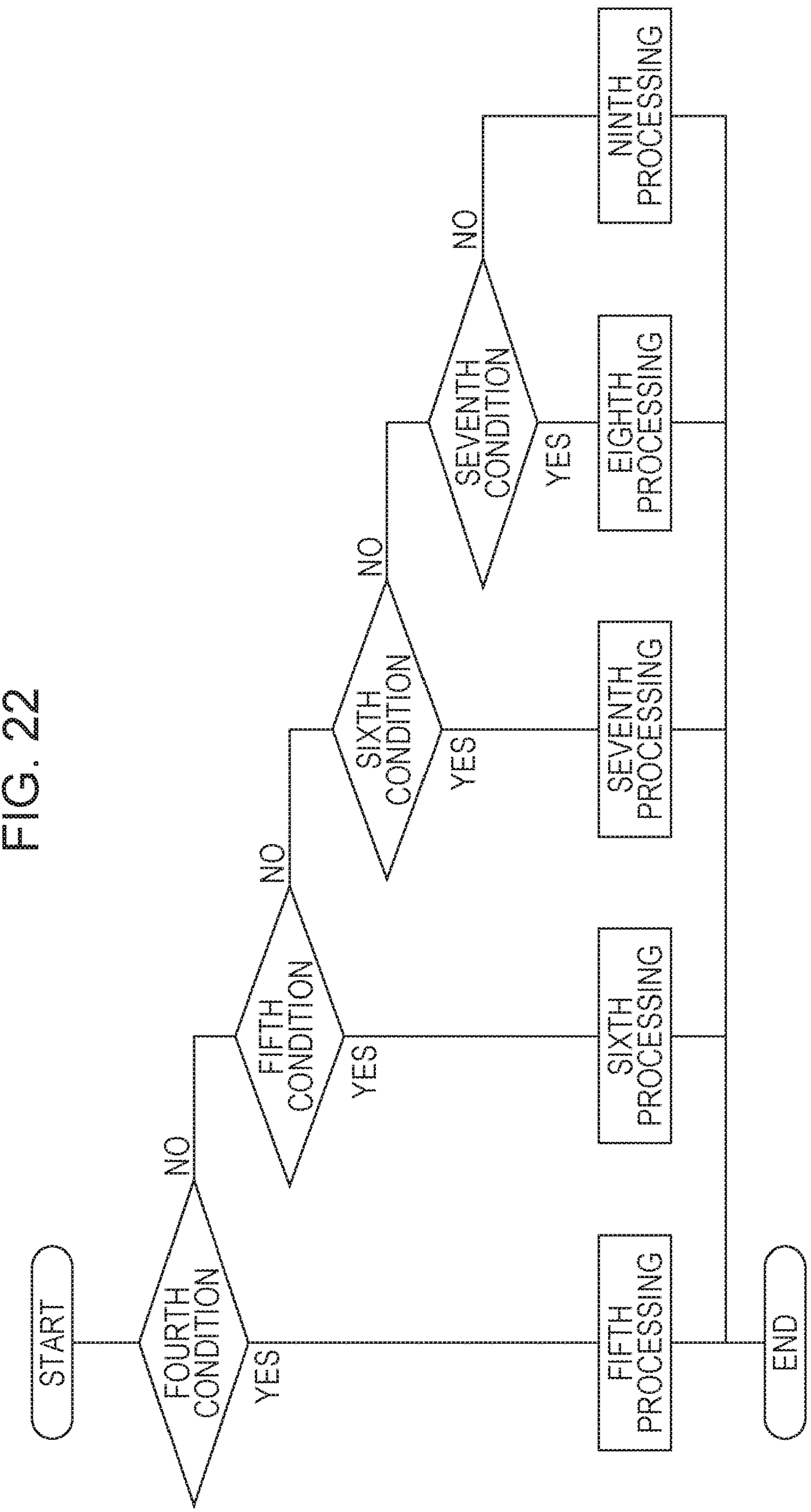
FIG. 22 is a diagram illustrating an example of a flowchart relating to determination of the total number $N'_{soft}$ of soft channel bits in the embodiment.

FIG. 22 is a diagram illustrating an example of a flowchart relating to determination of the total number $N'_{soft}$ of soft channel bits in the embodiment. The flow in FIG. 22 may be applied to each downlink component carrier (cell). In a case where a fourth condition is satisfied, fifth processing is performed. In a case where the fourth condition is not satisfied, the process proceeds to a fifth condition. In a case where the fifth condition is satisfied, sixth processing is performed. In a case where the fifth condition is not satisfied, the process proceeds to a sixth condition. In a case where the sixth condition is satisfied, seventh processing is performed. In a case where the sixth condition is not satisfied, the process proceeds to a seventh condition. In a case where the seventh condition is satisfied, eighth processing is performed. In a case where the seventh condition is not satisfied, ninth processing is performed. After the fifth processing, the sixth processing, the seventh processing, the eighth processing, or the ninth processing, the flow relating to the determination of the total number $N'_{soft}$ of soft channel bits is ended.

In the fourth condition of FIG. 22, if the terminal device 1 performs signaling of the capability parameter ue-CategoryDL-r12 (YES), $N_{soft}$ is the total number of soft channel bits corresponding to the downlink UE category which is indicated by the capability parameter ue-CategoryDL-r12 (fifth processing).

In the fifth condition of FIG. 22, if the terminal device 1 performs signaling of the capability parameter ue-Category-v11a0 and does not perform signaling of the capability parameter ue-CategoryDL-r12 (YES), $N_{soft}$ is the total number of soft channel bits corresponding to the UE category which is indicated by the capability parameter ue-Category-v11a0 (sixth processing).

In the sixth condition of FIG. 22, if the terminal device 1 performs signaling of the capability parameter ue-Category-v1170 and does not perform signaling of the capability parameter ue-Category-v11a0 and the capability parameter ue-CategoryDL-r12 (YES), $N_{soft}$ is the total number of soft channel bits corresponding to the UE category which is indicated by the capability parameter ue-Category-v1170 (seventh processing).

In the seventh condition of FIG. 22, if the terminal device 1 performs signaling of the capability parameter ue-Category-v1020 and does not perform signaling of the capability parameter ue-Category-v1170, the capability parameter ue-Category-v11a0, and the capability parameter ue-CategoryDL-r12 (YES), $N_{soft}$ is the total number of soft channel bits corresponding to the UE category which is indicated by the capability parameter ue-Category-v1020 (eighth processing).

In the seventh condition of FIG. 22, if the terminal device 1 performs signaling of the capability parameter ue-Category (without suffix) and does not perform signaling of the capability parameter ue-Category-v1020, the capability parameter ue-Category-v1170, the capability parameter ue-Category-v11a0, and the capability parameter ue-CategoryDL-r12 (NO), $N_{soft}$ is the total number of soft channel bits corresponding to the UE category which is indicated by the capability parameter ue-Category (without suffix) (ninth processing).

That is, in a case where an attempt of the terminal device 1 to decoding the code block of the transport block fails, soft channel bits stored by the terminal device 1 may be determined with reference to some or all of the followings (i) to (v): (i) a capability parameter which is transmitted among the capability parameter ue-Category (without suffix), the capability parameter ue-Category-v1020, the capability parameter ue-Category-v1170, and the capability parameter ue-CategoryDL-r12; (ii) whether or not the parameter LayersCount-v10xx is received/configured for the downlink component carrier; (iii) whether or not the parameter altCQI-Table-r12 is received/configured for the downlink component carrier; (iv) the number of layers supported by a PDSCH transmission scheme corresponding to a transmission mode which is configured in the terminal device 1 for the downlink component carrier; and (v) the maximum number of layers assumed for specifying a bit width for an RI.

A seventh example relating to a storing method of soft channel bits for a code block size of a transport block in Step S169 of FIG. 16 will be described below. The seventh example is applied to the terminal device 1.

(7-1) In the seventh example, the terminal device 1 includes the transmission unit 107, the reception unit 105, and the decoding portion 1051. The transmission unit 107 transmits a rank indicator (RI) for physical downlink shared channel (PDSCH) transmission. The reception unit 105 receives first information (RRCConnectionReconfiguration message) used for determining a first maximum value of layers, the first maximum value being assumed for determining a bit width of the RI, and receives a transport block on the PDSCH. The decoding portion 1051 decodes the code block of the transport block. Here, in a case where an attempt of the decoding portion 1051 to decode the code block fails, the decoding portion 1051 stores at least soft channel bits which correspond to a range of certain soft channel bits, among soft channel bits of the code block. Here, the certain soft channel bits are determined based on a soft buffer size for the code block. Here, the soft buffer size of the code block is determined based on at least the first information (RRCConnectionReconfiguration message) which is used for determining the first maximum value of layers.

(7-2) In the seventh example, the transmission unit 107 transmits the RI on a physical uplink shared channel (PUSCH).

(7-3) In the seventh example, a certain transmission mode relating to the PDSCH transmission is configured in the terminal device 1.

(7-4) In the seventh example, the transmission unit 107 transmits capability information (UECapabilityInformation) which includes second information (ue-Category (without suffix)) and third information (ue-Category-v1020). Here, the second information (ue-Category (without suffix)) indicates a first UE category corresponding to the second maximum value of layers supported by the terminal device in a downlink and corresponding to a first total number of soft channel bits which are available for hybrid automatic repeat request (HARQ) processing in the downlink. Here, the third information (ue-Category-v1020) indicates a second UE category corresponding to the third maximum value of layers supported by the terminal device in the downlink and corresponding to a second total number of soft channel bits which are available for hybrid automatic repeat request (HARQ) processing in the downlink. Here, the soft buffer size for the code block is determined based on whether or not the first information (RRCConnectionReconfiguration message) used for determining the first maximum value of layers indicates the fourth maximum value of layers. The determination is performed with reference to one of the first total number and the second total number. That is, the soft buffer size for the code block is determined based on whether or not the first information used for determining the first maximum value of layers is configured so as to have a value indicating the fourth maximum value of layers. The determination is performed with reference to one of the first total number and the second total number.

(7-5) In the seventh example, in a case where the first information (RRCConnectionReconfiguration message) used for determining the first maximum value of layers indicates the fourth maximum value of layers, the soft buffer size for the code block is determined with reference to the first total number. Here, in a case where the first information (RRCConnectionReconfiguration message) used for determining the first maximum value of layers does not indicate the fourth maximum value of layers, the soft buffer size for the code block is determined with reference to the second total number. Here, a case where "the first information (RRCConnectionReconfiguration message) does not indicate the fourth maximum value of layers" includes a case where "the first information (RRCConnectionReconfiguration message) does not include the parameter LayersCount-v10xx". That is, in a case where the first information used for determining the first maximum value of layers is configured so as to have a value indicating the fourth maximum value of layers, the soft buffer size for the code block is determined with reference to the first total number. In a case where the first information used for determining the first maximum value of layers is not configured so as to have a value indicating the fourth maximum value of layers, the soft buffer size for the code block is determined with reference to the second total number.

(7-6) In the seventh example, in a case where the first information (RRCConnectionReconfiguration message) used for determining the first maximum value of layers indicates the fourth maximum value of layers, the first maximum value of layers is determined with reference to the fourth maximum value of layers. Here, a case where "the first information (RRCConnectionReconfiguration message) indicates the fourth maximum value of layers" includes a case where "the parameter LayersCount-v10xx included in the first information (RRCConnectionReconfiguration message) indicates the fourth maximum value of layers". That is, in a case where the first information is received, the first maximum value of layers is determined with reference to the first information.

(7-7) In the seventh example, in a case where the first information (RRCConnectionReconfiguration message) used for determining the first maximum value of layers does not indicate the fourth maximum value of layers, the first maximum value of layers is determined with reference to any one of a plurality of maximum numbers of layers, which includes the second maximum value of layers, and the third maximum value of layers. That is, in a case where the first information is not received, the first maximum value of layers is determined with reference to one of the second information and the third information.

One bandwidth class corresponds to the number of contiguous component carriers in one band in the frequency domain, which are supported by the terminal device 1. However, the one bandwidth class is not allowed to correspond to the number of component carriers which are not contiguous in the one band in the frequency domain, and are supported by the terminal device 1. The number of component carriers which are not contiguous in the one band in the frequency domain, and are supported by the terminal device 1 can be expressed by a plurality of bandwidth classes which are respectively indicated by a plurality of parameters ca-BandwidthClassDL-r10. The plurality of parameters ca-BandwidthClassDL-r10 is included in the same one parameter BandCombinationParameters-r10.

FIG. 23 is a diagram illustrating an example of the parameter BandCombinationParameters-r10 in the embodiment. The parameter BandCombinationParameters-r10 (P2300) in FIG. 23 includes two parameters BandParameters-r10 (P2310 and P2320).

A parameter FreqBandIndicator (P2311) included in the parameter BandParameters-r10 (P2310) indicates a band X. That is, the parameter BandParameters-r10 (P2310) corresponds to the band X. A parameter ca-BandwidthClassDL-r10 (P2312) included in the parameter BandParameters-r10 (P2310) indicates a bandwidth class A. That is, the parameter BandParameters-r10 (P2310) corresponds to any one of downlink component carriers included in the band X. A parameter supportedMIMO-CapabilityDL-r10 (P2313) included in the parameter BandParameters-r10 (P2310) indicates 4. That is, the maximum number of layers in one downlink component carrier corresponding to the parameter ca-BandwidthClassDL-r10 (P2312) is 4. A parameter ca-BandwidthClassUL-r10 (P2314) included in the parameter BandParameters-r10 (P2310) indicates the bandwidth class A. That is, the parameter BandParameters-r10 (P2310) corresponds to any one of uplink component carriers included in the band X.

A parameter FreqBandIndicator (P2321) included in the parameter BandParameters-r10 (P2320) indicates the band X. That is, the parameter BandParameters-r10 (P2320) corresponds to the band X. A parameter ca-BandwidthClassDL-r10 (P2322) included in the parameter BandParameters-r10 (P2320) indicates the bandwidth class A. That is, the parameter BandParameters-r10 (P2320) corresponds to any one of downlink component carriers included in the band X. A parameter supportedMIMO-CapabilityDL-r10 (P2323) included in the parameter BandParameters-r10 (P2320) indicates 2. That is, the maximum number of layers in one downlink component carrier corresponding to the parameter ca-BandwidthClassDL-r10 (P2322) is 2. The parameter BandParameters-r10 (P2320) does not include a parameter bandParametersUL-r10. That is, the parameter BandParameters-r10 (P2320) corresponds to a secondary cell (downlink component carrier) which does not correspond to an uplink component carrier (uplink resource). A primary cell necessarily corresponds to one downlink component carrier and one uplink component carrier. That is, the primary cell necessarily has an uplink component carrier (uplink resource).

The base station apparatus 3 configures a primary cell and a secondary cell in the band X, in the terminal device 1 in accordance with the received parameter BandCombination-Parameters-r10 (P2300). Here, a downlink component carrier corresponding to the primary cell and a downlink component carrier corresponding to the secondary cell may be uncontiguous in the frequency domain. Here, the secondary cell of the band X does not have an uplink component carrier (uplink resource).

In a case where the parameter BandCombinationParameters-r10 (P2300) is transmitted to the base station apparatus 3, and a primary cell and a secondary cell in the band X is configured in the terminal device 1, the terminal device 1 and the base station apparatus 3 consider that the fifth maximum value of layers in the primary cell is determined by the parameter supportedMIMO-CapabilityDL-r10 (P2313), and the fifth maximum value of layers in the secondary cell is determined by the parameter supportedMIMO-CapabilityDL-r10 (P2323). Here, the secondary cell of the band X does not have an uplink component carrier (uplink resource). That is, the base station apparatus 3 and the terminal device select any one of the parameter supportedMIMO-CapabilityDL-r10 (P2313) and the parameter supportedMIMO-CapabilityDL-r10 (P2323), as a parameter for determining the fifth maximum value of layers, which is assumed for determining a bit width for an RI. The selection is performed in accordance with whether a serving cell in the band X is a primary cell or a secondary cell which does not have an uplink component carrier (uplink resource).

An eighth example of the specifying method of a bit width for an RI in Step S165 in FIG. 16 will be described below. The eighth example is applied to the terminal device 1.

(8-1) In the eighth example, the terminal device 1 is a terminal device in which a plurality of downlink component carriers in the first band in the first band combination is configured. The plurality of downlink component carriers includes a first downlink component carrier. Here, the terminal device 1 includes the transmission unit 107 and the reception unit 105. The reception unit 105 receives a PDSCH. The transmission unit 107 transmits a rank indicator (RI) determined by the terminal device. The RI corresponds to physical downlink shared channel (PDSCH) transmission in the first downlink component carrier, and corresponds to the number of layers. Here, the transmission unit 107 transmits capability information which includes first information, second information, third information, fourth information, and/or fifth information. Here, the reception unit 105 receives sixth information for the first downlink component carrier. Here, the first information indicates an UE category corresponding to the first maximum value of layers supported by the terminal device in a downlink. Here, the second information indicates the first bandwidth class which is used for the first band in the first band combination and corresponds to the number of downlink component carriers supported by the terminal device. Here, the third information indicates the second bandwidth class which is used for the first band in the first band combination and corresponds to the number of downlink component carriers supported by the terminal device. Here, the fourth information indicates the second maximum value of layers supported by the terminal device in the downlink. The second maximum value of layers is applied to one or all of a plurality of downlink component carriers corresponding to the first bandwidth class of the first band in the first band combination. Here, the fifth information indicates the third maximum value of layers supported by the terminal device in the downlink. The third maximum value of layers is applied to one or all of plurality of downlink component carriers corresponding to the second bandwidth class of the first band in the first band combination. Here, the sixth information indicates the fourth maximum value of layers. Here, the fifth maximum value of layers, which is assumed for determining a bit width for the RI is determined based on whether the first downlink component carrier corresponds to a primary cell or a secondary cell. The determination is performed with reference to one of the second maximum value of layers and the third maximum value of layers.

A ninth example of the specifying method of a bit width for an RI in Step S165 in FIG. 16 will be described below. The ninth example is applied to the base station apparatus 3.

(9-1) In the ninth example, the base station apparatus 3 is a base station apparatus which communicates with a terminal device in which a plurality of downlink component carriers in a first band in a first band combination is configured. The plurality of downlink component carriers includes a first downlink component carrier. Here, the base station apparatus 3 includes the reception unit 305 and the transmission unit 307. The transmission unit 307 transmits a PDSCH. The reception unit 305 receives a rank indicator (RI) determined by the terminal device. The RI corresponds to physical downlink shared channel (PDSCH) transmission in the first downlink component carrier and corresponds to the number of layers. Here, the reception unit 305 receives capability information which includes first information, second information, third information, fourth information, and/or fifth information, from the terminal device. Here, the transmission unit 307 transmits sixth information for the first downlink component carrier, to the terminal device. Here, the first information indicates an UE category corresponding to the first maximum value of layers supported by the terminal device in a downlink. The second information indicates the first bandwidth class which is used for the first band in the first band combination and corresponds to the number of downlink component carrier supported by the terminal device. Here, the third information indicates the second bandwidth class which is used for the first band in the first band combination and corresponds to the number of downlink component carrier supported by the terminal device. Here, the fourth information indicates the second maximum value of layers supported by the terminal device in the downlink. The second maximum value of layers is applied to one or all of a plurality of downlink component carriers corresponding to the first bandwidth class of the first band in the first band combination. Here, the fifth information indicates the third maximum value of layers supported by the terminal device in the downlink. The third maximum value of layers is applied to one or all of a plurality of downlink component carriers corresponding to the second bandwidth class of the first band in the first band combination. Here, the sixth information indicates the fourth maximum value of layers. Here, the fifth maximum value of layers, which is assumed for determining a bit width for the RI is determined based on whether the first downlink component carrier corresponds to a primary cell or a secondary cell. The determination is performed with reference to one of the second maximum value of layers and the third maximum value of layers.

FIG. 24 is a diagram illustrating an example of the parameter BandCombinationParameters-r10 in the embodiment. The parameter BandCombinationParameters-r10 (P2400) in FIG. 24 includes two parameters BandParameters-r10 (P2310 and P2420).

The parameter BandParameters-r10 (P2310) in FIG. 24 has the same structure and the same value as those of the parameter BandParameters-r10 (P2310) in FIG. 23. A parameter bandEUTRA-r10 in the parameter BandParameters-r10 (P2420) of FIG. 24 has the same structure and the same value as those of the parameter bandEUTRA-r10 included in the parameter BandParameters-r10 (P2320) in FIG. 23. A parameter bandParametersDL-r10 in the parameter BandParameters-r10 (P2420) of FIG. 24 has the same structure and the same value as those of the parameter bandParametersDL-r10 included in the parameter BandParameters-r10 (P2320) in FIG. 23. The parameter BandParameters-r10 (P2420) in FIG. 24 includes a parameter bandParametersUL-r10. A parameter ca-BandwidthClassDL-r10 (P2424) included in the parameter BandParameters-r10 (P2420) indicates the bandwidth class A. That is, the parameter BandParameters-r10 (P2420) corresponds to any one of uplink component carriers included in the band X.

The base station apparatus 3 configures a primary cell and a secondary cell in the band X, in the terminal device 1 in accordance with the received parameter BandCombinationParameters-r10 (P2400). Here, a downlink component carrier corresponding to the primary cell and a downlink component carrier corresponding to the secondary cell may be uncontiguous in the frequency domain. Here, the secondary cell of the band X does not have an uplink component carrier (uplink resource).

In a case where the parameter BandCombinationParameters-r10 (P2400) is transmitted to the base station apparatus 3, and a primary cell and a secondary cell in the band X is configured in the terminal device 1, the terminal device 1 and the base station apparatus do not enable determination of which one of the parameter supportedMIMO-CapabilityDL-r10 (P2313) and the parameter supportedMIMO-CapabilityDL-r10 (P2323) causes the fifth maximum value of layers in the primary cell to be determined. Here, the secondary cell of the band X has an uplink component carrier (uplink resource).

In such a case, it is preferable that the base station apparatus 3 transmits the parameter LayersCount-v10xx for the primary cell and the parameter LayersCount-v10xx for secondary cell, to the terminal device 1. Here, the terminal device 1 refers to the parameter LayersCount-v10xx for the primary cell, and thus specifies the fifth maximum value of layers, which is assumed for determining a bit width for an RI for the primary cell. The terminal device 1 refers to the parameter LayersCount-v10xx for the secondary cell, and thus specifies the fifth maximum value of layers, which is assumed for determining a bit width for an RI for the secondary cell. In a case where the terminal device 1 does not receive/configure the parameter LayersCount-v10xx for the primary cell and the parameter LayersCount-v10xx for the secondary cell, the fifth maximum value of layers, which is assumed for determining the bit width for the RI for the primary cell, and the fifth maximum value for layers, which is assumed for determining the bit width for the RI for the secondary cell may be determined based on the maximum number of layers corresponding to the capability parameter ue-Category (without suffix).

A tenth example of the specifying method of a bit width for an RI in Step S165 in FIG. 16 will be described below. The tenth example is applied to the terminal device 1.

(10-1) In the tenth example, the terminal device 1 is a terminal device in which a plurality of downlink component carriers in the first band in the first band combination is configured. The plurality of downlink component carriers includes a first downlink component carrier. Here, the terminal device 1 includes the transmission unit 107 and the reception unit 105. The reception unit 105 receives a PDSCH. The transmission unit 107 transmits a rank indicator (RI) determined by the terminal device. The RI corresponds to physical downlink shared channel (PDSCH) transmission in the first downlink component carrier, and corresponds to the number of layers. Here, the transmission unit 107 transmits capability information which includes first information, second information, third information, fourth information, and/or fifth information. Here, the reception unit 105 receives sixth information for the first downlink component carrier. Here, the first information indicates an UE category corresponding to the first maximum value of layers supported by the terminal device in a downlink. Here, the second information indicates the first bandwidth class which is used for the first band in the first band combination and corresponds to the number of downlink component carriers supported by the terminal device. Here, the third information indicates the second bandwidth class which is used for the first band in the first band combination and corresponds to the number of downlink component carriers supported by the terminal device. Here, the fourth information indicates the second maximum value of layers supported by the terminal device in the downlink. The second maximum value of layers is applied to one or all of a plurality of downlink component carriers corresponding to the first bandwidth class of the first band in the first band combination. Here, the fifth information indicates the third maximum value of layers supported by the terminal device in the downlink. The third maximum value of layers is applied to one or all of plurality of downlink component carriers corresponding to the second bandwidth class of the first band in the first band combination. Here, the sixth information indicates the fourth maximum value of layers. Here, the fifth maximum value of layers, which is assumed for determining a bit width for the RI is determined based on whether or not the sixth information for the first downlink component carrier is configured. The determination is performed with reference to one of the first maximum value of layers and the fourth maximum value of layers.

(10-2) In the tenth example, in a case where the sixth information for the first downlink component carrier is not configured, the fifth maximum value of layers, which is assumed for determining the bit width for the RI is determined with reference to the first maximum value of layers. Here, in a case where the sixth information for the first downlink component carrier is configured, the fifth maximum value of layers, which is assumed for determining the bit width for the RI is determined with reference to the fourth maximum value of layers.

(10-3) In the tenth example, the transmission mode 3 or the transmission mode 4 is configured in the terminal device.

An 11th example of the specifying method of a bit width for an RI in Step S165 in FIG. 16 will be described below. The 11th example is applied to the base station apparatus 3.

(11-1) In the 11th example, the base station apparatus 3 is a base station apparatus which communicates with a terminal device in which a plurality of downlink component carriers in a first band in a first band combination is configured. The plurality of downlink component carriers includes a first downlink component carrier.

Here, the base station apparatus 3 includes the reception unit 305 and the transmission unit 307. The transmission unit 307 transmits a PDSCH. The reception unit 305 receives a rank indicator (RI) determined by the terminal device. The RI corresponds to physical downlink shared channel (PDSCH) transmission in the first downlink component carrier and corresponds to the number of layers. Here, the reception unit 305 receives capability information which includes first information, second information, third information, fourth information, and/or fifth information, from the terminal device. Here, the transmission unit 307 transmits sixth information for the first downlink component carrier, to the terminal device. Here, the first information indicates an UE category corresponding to the first maximum value of layers supported by the terminal device in a downlink. The second information indicates the first bandwidth class which is used for the first band in the first band combination and corresponds to the number of downlink component carrier supported by the terminal device. Here, the third information indicates the second bandwidth class which is used for the first band in the first band combination and corresponds to the number of downlink component carrier supported by the terminal device. Here, the fourth information indicates the second maximum value of layers supported by the terminal device in the downlink. The second maximum value of layers is applied to one or all of a plurality of downlink component carriers corresponding to the first bandwidth class of the first band in the first band combination. Here, the fifth information indicates the third maximum value of layers supported by the terminal device in the downlink. The third maximum value of layers is applied to one or all of a plurality of downlink component carriers corresponding to the second bandwidth class of the first band in the first band combination. Here, the sixth information indicates the fourth maximum value of layers. Here, the fifth maximum value of layers, which is assumed for determining a bit width for the RI is determined based on whether or not the sixth information for the first downlink component carrier is configured. The determination is performed with reference to one of the first maximum value of layers and the fourth maximum value of layers.

(11-2) In the 11th example, in a case where the sixth information for the first downlink component carrier is not configured in the terminal device, the fifth maximum value of layers, which is assumed for determining the bit width for the RI is determined with reference to the first maximum value of layers. Here, in a case where the sixth information for the first downlink component carrier is configured in the terminal device, the fifth maximum value of layers, which is assumed for determining the bit width for the RI is determined with reference to the fourth maximum value of layers.

(11-3) In the 11th example, the transmission mode 3 or the transmission mode 4 is configured in the terminal device.

The capability information (UECapabilityInformation) may indicate whether or not the maximum number of layers, which is indicated by the parameter supportedMIMO-CapabilityDL-r10 is applied to the transmission mode 3 and/or the transmission mode 4. The capability information (UECapabilityInformation) may include a parameter X indicating that the maximum number of layers, which is indicated by the parameter supportedMIMO-CapabilityDL-r10 can be applied to the transmission mode 3 and/or the transmission mode 4.

The capability information (UECapabilityInformation) may indicate whether or not the maximum number of layers, which is indicated by the parameter supportedMIMO-CapabilityDL-v10xx is applied to the transmission mode 3 and/or the transmission mode 4. The capability information (UECapabilityInformation) may include a parameter Y indicating that the maximum number of layers, which is indicated by the parameter supportedMIMO-CapabilityDL-v10xx can be applied to the transmission mode 3 and/or the transmission mode 4. The parameter Y may be the same as the parameter X or be different from the parameter X.

In a case where the parameter X is not included in the capability information (UECapabilityInformation), for the transmission mode 3 and/or the transmission mode 4, the fifth maximum value of layers, which is assumed for the bit width of the RI may be determined by the maximum number of layers, which corresponds to the capability parameter ue-Category (without suffix).

In a case where the parameter Y is not included in the capability information (UECapabilityInformation), for the transmission mode 3 and/or the transmission mode 4, the fifth maximum value of layers, which is assumed for the bit width of the RI may be determined by the maximum number of layers, which corresponds to the capability parameter ue-Category (without suffix).

In a case where the parameter X and the parameter Y are not included in the capability information (UECapabilityInformation), for the transmission mode 3 and/or the transmission mode 4, the fifth maximum value of layers, which is assumed for the bit width of the RI may be determined by the maximum number of layers, which corresponds to the capability parameter ue-Category (without suffix).

Hitherto, the embodiment is described in detail with reference to the first example to the 11th example, and FIGS. 1 to 24. However, various changes in a range represented by the first example to the 11th example, and FIGS. 1 to 24 may be made. A different example, and technical means/method obtained by appropriately combining the technical means/methods disclosed in the drawings may be also included in the technical scope of the present invention.

Thus, even when the base station apparatus 3 does not know the corresponding release and the corresponding version of LTE, the terminal device 1 can efficiently communicate with the base station apparatus 3. Even when the terminal device 1 does not know the corresponding release and the corresponding version of LTE, the base station apparatus 3 can efficiently communicate with the terminal device 1.

A program operated in the base station apparatus 3 and the terminal device 1 according to the embodiment may be a program (a program for causing a computer to function) to control a central processing unit (CPU) and the like so as to realize the functions of the above embodiment of the present invention. Information which is handled by the apparatus and the device is temporarily accumulated in a random access memory (RAM) while processed. Then, the information is stored in various ROMs such as a flash ROM (read only memory), or a hard disk drive (HDD). The information is read by the CPU and is modified and written, as necessary.

In the above-described embodiment, some components of the terminal device 1 and the base station apparatus 3 may be realized by a computer. In this case, realization may be performed in such a manner that a program for realizing the control function is recorded in a computer-readable recording medium, and the program recorded in the computer-readable recording medium is read to a computer system, and is executed.

The term "computer system" used herein is a computer system which is incorporated in the terminal device 1 or the base station apparatus 3, and includes an OS or hardware, such as peripherals. The term "computer-readable recording medium" refers to a portable medium, such as a flexible disk, a magneto-optical disk, a ROM, or a CD-ROM, or a storage device, such as a hard disk incorporated in the computer system.

The term "computer-readable recording medium" may include a medium which holds the program in a short period of time or dynamically, such as a communication line when transmitting the program through a network, such as Internet, or a communication line, such as a telephone line, and a medium which holds the program in a certain period of time, such as a volatile memory inside the computer system to be a server or a client. The program may implement some of the above-described functions or may implement the above-described functions in combination with the program already recorded in the computer system.

The base station apparatus 3 in the above-described embodiment may be implemented as an aggregate (device group) of a plurality of devices. Each device in the device group may include part or all of the functions or the function blocks of the base station apparatus 3 of the above-described embodiment. As the device group, the general functions or functional blocks of the base station apparatus 3 may be provided. The terminal device 1 of the above-described embodiment may communicate with the base station apparatus as an aggregate.

The base station apparatus 3 in the above-described embodiment may be EUTRAN (Evolved Universal Terrestrial Radio Access Network). The base station apparatus 3 in the above-described embodiment may have part or all of the functions of a higher node to eNodeB.

Part or all of the terminal device 1 and the base station apparatus 3 of the foregoing embodiment may be typically implemented as an LSI, which is an integrated circuit, or may be implemented as a chipset. The functional blocks of the terminal device 1 and the base station apparatus 3 may be individually integrated into chips, or some or all of the functional blocks may be integrated into a chip. The integration into a circuit is not limited to LSI and may be implemented by a dedicated circuit or a general-purpose processor. When a technique for integration into a circuit, which will replace LSI, emerges with the advancement of semiconductor technology, an integrated circuit based on the technique may be used.

In the above-described embodiment, the terminal device is described as an example of a terminal device or a communication device. However, this application invention is not limited thereto. This application invention may be applied to a terminal device or a communication device of stationary or immovable electronic apparatuses indoors and outdoors, for example, such as an AV system, kitchen equipment, cleaning and washing equipment, air conditioner, office equipment, vending machine, and other living appliances.

While the embodiments of the invention have been described referring to the drawings, specific configurations are not limited to the embodiments and design changes within the scope of the invention are also encompassed. Various modifications may be made to the invention within the scope defined by the appended claims, and an embodiment practiced by combining appropriate technical means disclosed in different embodiments also falls within the technical scope of the invention. A configuration in which elements described in the embodiments and having similar effects are interchanged is also encompassed.

INDUSTRIAL APPLICABILITY

The present invention can be applied to a terminal device, a communication device, or the like such as a portable phone, a personal computer, a tablet computer, AV equipment, kitchen utensil, cleaning and washing equipment, an air conditioner, office equipment, a vending machine, living appliances.

DESCRIPTION OF REFERENCE NUMERALS

1 (1A, 1B, 1C) TERMINAL DEVICE
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL PORTION
1013 SCHEDULING INFORMATION ANALYSIS PORTION
1015 CSI REPORT CONTROL PORTION
3011 RADIO RESOURCE CONTROL PORTION
3013 SCHEDULING PORTION
3015 CSI REPORT CONTROL PORTION

The invention claimed is:

1. A terminal device comprising:
transmission circuitry configured to
transmit a rank indicator (RI) for physical downlink shared channel (PDSCH) transmission, and
transmit the RI on a physical uplink shared channel (PUSCH);
reception circuitry configured to
receive first information used for determining a first maximum value of layers, the first maximum value being assumed for determining a bit width for the RI, and
receive a transport block on a PDSCH; and
decoding circuitry configured to decode that decodes a code block of the transport block,
wherein
rate matching for the code block is performed based on at least a soft buffer size for the code block,
the soft buffer size for the code block is determined based on at least the first information which is used for determining the first maximum value of the layers, and
a first transmission mode relating to the PDSCH transmission is configured.

2. The terminal device according to claim 1, wherein
the transmission circuitry is configured to transmit capability information including second information and third information,
the second information indicates a first UE category corresponding to a second maximum value of the layers supported by the terminal device in a downlink, and corresponding to a first total number of soft channel bits which are available for hybrid automatic repeat request (HARQ) processing in the downlink,
the third information indicates a second UE category corresponding to a third maximum value of the layers supported by the terminal device in the downlink, and corresponding to a second total number of soft channel bits which are available for the hybrid automatic repeat request (HARQ) processing in the downlink, and
the soft buffer size for the code block is determined with reference to any one of the first total number and the second total number, based on whether or not the first information used for determining the first maximum value of the layers is configured to a value indicating a fourth maximum value of the layers.

3. The terminal device according to claim 2, wherein
in a case where the first information used for determining the first maximum value of the layers is configured to the value indicating the fourth maximum value of the layers, the soft buffer size for the code block is determined with reference to the first total number, and
in a case where the first information used for determining the first maximum value of the layer is not configured to the value indicating the fourth maximum value of the layers, the soft buffer size for the code block is determined with reference to the second total number.

4. The terminal device according to claim 2, wherein
in a case where the first information is received, the first maximum value of the layers is determined with reference to the first information.

5. The terminal device according to claim 2, wherein
in a case where the first information is not received, the first maximum value of the layers is determined with reference to the third information.

6. A base station apparatus comprising:
reception circuitry configured to
receive a rank indicator (RI) for physical downlink shared channel (PDSCH) transmission, from a terminal device, and
receive the RI from the terminal device on a physical uplink shared channel (PUSCH);
transmission circuitry configured to
transmit first information used by the terminal device for determining a first maximum value of layers to the terminal device, the first maximum value being assumed by the terminal device in order to determine a bit width for the RI, and
transmit a transport block on a PDSCH to the terminal device; and
coding circuitry configured to code a code block of the transport block,
wherein
rate matching for the coded code block is performed based on at least a soft buffer size for the code block,
the soft buffer size for the code block is determined based on at least the first information which is used by the terminal device in order to determine the first maximum value of the layers, and
a first transmission mode relating to the PDSCH transmission is configured.

7. The base station apparatus according to claim 6, wherein the reception circuitry is configured to receive capability information including second information and third information from the terminal device, the second information indicates a first UE category corresponding to a second maximum value of the layers supported by the terminal device in a downlink, and corresponding to a first total number of soft channel bits which are available for hybrid automatic repeat request (HARQ) processing in the downlink, the third information indicates a second UE category corresponding to a third maximum value of the layers supported by the terminal device in the downlink, and corresponding to a second total number of soft channel bits which are available for the hybrid automatic repeat request (HARQ) processing in the downlink, and the soft buffer size for the code block is determined with reference to any one of the first total number and the second total number, based on whether or not the first information used for determining the first maximum value of the layers is configured to a value indicating a fourth maximum value of the layers.

8. The base station apparatus according to claim 7, wherein in a case where first information used by the terminal device in order to determine the first maximum value of the layers is configured to the value indicating the fourth maximum value of the layers, the soft buffer size for the code block is determined with reference to the first total number, and in a case where the first information used by the terminal device in order to determine the first maximum value of the layer is not configured to the value indicating the fourth maximum value of the layers, the soft buffer size for the code block is determined with reference to the second total number.

9. The base station apparatus according to claim 7, wherein in a case where the first information is received, the first maximum value of the layers is determined with reference to the first information.

10. The base station apparatus according to claim 7, wherein in a case where the first information is not received, the first maximum value of the layers is determined with reference to the third information.

11. A communication method used in a terminal device, the method comprising:

transmitting a rank indicator (RI) for physical downlink shared channel (PDSCH) transmission;

transmitting the RI on a physical uplink shared channel (PUSCH);

receiving first information used for determining a first maximum value of layers, the first maximum value being assumed for determining a bit width for the RI;

receiving a transport block on a PDSCH; and decoding a code block of the transport block, wherein rate matching for the code block is performed based on at least a soft buffer size for the code block, and the soft buffer size for the code block is determined based on at least the first information which is used for determining the first maximum value of the layers, and a first transmission mode relating to the PDSCH transmission is configured.

12. A communication method used in a base station apparatus, the method comprising:

receiving a rank indicator (RI) for physical downlink shared channel (PDSCH) transmission, from a terminal device;

receiving the RI on a physical uplink shared channel (PUSCH);

transmitting first information used by the terminal device for determining a first maximum value of layers to the terminal device, the first maximum value being assumed by the terminal device in order to determine a bit width for the RI;

transmitting a transport block on a PDSCH to the terminal device; and coding a code block of the transport block, wherein rate matching for the coded code block is performed based on at least a soft buffer size for the code block, the soft buffer size for the code block is determined based on at least the first information which is used by the terminal device in order to determine the first maximum value of the layers, and a first transmission mode relating to the PDSCH transmission is configured.

13. An integrated circuit configured to cause a terminal device to perform at least:

transmitting a rank indicator (RI) for physical downlink shared channel (PDSCH) transmission;

transmitting the RI on a physical uplink shared channel (PDSCH);

receiving first information used for determining a first maximum value of layers, the first maximum value being assumed for determining a bit width for the RI;

receiving a transport block on a PDSCH; and decoding a code block of the transport block, wherein rate matching for the code block is performed based on at least a soft buffer size for the code block, the soft buffer size for the code block is determined based on at least the first information which is used for determining the first maximum value of the layers, and a first transmission mode relating to the PDSCH transmission is configured.

14. An integrated circuit configured to cause a base station apparatus to perform at least:

receiving a rank indicator (RI) for physical downlink shared channel (PDSCH) transmission, from a terminal device;

receiving the RI on a physical uplink shared channel (PDSCH);

transmitting first information used by the terminal device for determining a first maximum value of layers to the terminal device, the first maximum value being assumed by the terminal device in order to determine a bit width for the RI;

transmitting a transport block on a PDSCH to the terminal device; and coding a code block of the transport block, wherein rate matching for the coded code block is performed based on at least a soft buffer size for the code block, the soft buffer size for the code block is determined based on at least the first information which is used by the terminal device in order to determine the first maximum value of the layers, and a first transmission mode relating to the PDSCH transmission is configured.

* * * * *